United States Patent
Sakai

(10) Patent No.: US 7,717,136 B2
(45) Date of Patent: May 18, 2010

(54) PIPELINE CLOSING APPARATUS

(75) Inventor: Atsushi Sakai, Sasayama (JP)

(73) Assignee: Waterworks Technology Development Organization Co., Ltd., Osaka (JP)

( * ) Notice: Subject to any disclaimer, the term of this patent is extended or adjusted under 35 U.S.C. 154(b) by 1055 days.

(21) Appl. No.: 10/577,787

(22) PCT Filed: Oct. 26, 2004

(86) PCT No.: PCT/JP2004/015823

§ 371 (c)(1),
(2), (4) Date: Apr. 28, 2006

(87) PCT Pub. No.: WO2005/043027

PCT Pub. Date: May 12, 2005

(65) Prior Publication Data

US 2008/0277930 A1    Nov. 13, 2008

(30) Foreign Application Priority Data

Oct. 31, 2003   (JP) .............................. 2003-372409
Apr. 12, 2004   (JP) .............................. 2004-116811

(51) Int. Cl.
*F16L 55/00* (2006.01)
(52) U.S. Cl. .......................................... 138/89; 138/94
(58) Field of Classification Search .................. 138/94, 138/94.3; 137/15.15, 319, 317; 251/190
See application file for complete search history.

(56) References Cited

U.S. PATENT DOCUMENTS 2,108,068 A * 2/1938 Larry .......................... 251/190
2,171,939 A * 9/1939 Larry et al. ............. 137/625.48
2,588,188 A * 3/1952 Weisman ...................... 138/89

FOREIGN PATENT DOCUMENTS

| JP | 62111735 | 5/1987 |
| JP | 43196 | 1/1992 |
| JP | 781669 | 9/1995 |
| JP | 2657925 | 6/1997 |
| JP | 10255369 | 9/1998 |

\* cited by examiner

*Primary Examiner*—Patrick F Brinson
(74) *Attorney, Agent, or Firm*—The Webb Law Firm

(57) ABSTRACT

A pipeline closing apparatus comprises a lid member attachable to a downstream end portion of a sluice valve, a first control shaft extending through the lid member, a second control shaft extending through the first control shaft, an elastic annular member disposed between pressing plates and provided on inward end regions of the control shafts and elastically deformable to a diameter-increased position by being clamped and pressed, thereby to block between an inner peripheral surface of a branch pipe and the pressing plates, and a retaining device. The retaining device includes engaging link pairs flexing and bulging to a diameter-increased position in response to outward sliding movement of the second control shaft relative to the first control shaft. The apparatus further comprises a reversal preventing device F which, contacts and limits the engaging link pairs and to an outwardly bent position where flexing pivotal portions of the engaging link pairs project radially outward.

13 Claims, 18 Drawing Sheets

PRIOR ART

PIPELINE CLOSING APPARATUS

TECHNICAL FIELD

The present invention relates to a pipeline closing apparatus used in changing of a sluice valve or a butterfly valve disposed in a branch pipe for a fireplug or an air valve diverging from and connected to a water main while water supply is continued in the water main with water leakage from the branch pipe being prevented.

BACKGROUND ART

As shown in FIG. 21, a conventional pipeline closing apparatus includes a bottomed tubular lid member 7 attachable to a downstream end portion of a sluice valve for closing an end opening of a branch pipe diverging from and connected to a fluid transmitting main and having the sluice valve disposed in an intermediate portion thereof, a cylindrical first control shaft 8 extending through the lid member 7 to be axially slidable in sealed condition, and a second control shaft 9 extending through the first control shaft 8 to be axially slidable. The first control shaft 8 and second control shaft 9 have pressing plates 10 and 11 attached to inward end regions thereof, respectively. An elastic annular member 12 having a circular cross section is disposed between the pressing plates 10 and 11 to be elastically deformable, by being clamped and pressed by the pair of pressing plates 10 and 11 from axial directions, to a diameter-increased position in tight contact with an inner peripheral surface of the branch pipe to block between the inner peripheral surface and outer peripheral portions of the two pressing plates 10 and 11. Further, a retaining device D is provided as having engaging link pairs 13 and 14 arranged in three circumferential positions and extending between the inward end of the second control shaft 9 and the first pressing plate 10 disposed upstream, for flexing and bulging to a diameter-increased position to engage a large diameter pipe portion formed upstream of a blocked position by the elastic annular member 12, in response to an outward sliding movement of the second control shaft 9 relative to the first control shaft 8.

The retaining device D includes a mounting tubular member 21 slidably fitted on the inward end portion of the second control shaft 9 and having second connecting elements 22 provided in three circumferential positions on an outer peripheral surface thereof to which to ends of the upstream engaging links 13 pivotably connected. Ends of the downstream engaging links 14 are pivotably connected to first connecting elements 20 provided in three circumferential positions on an end surface of the upstream second pressing plate 11. Further, a stopper nut 15 and a lock nut 16 are screwed to the inward end portion of the second control shaft 9 for determining a maximum upstream movement position of the second pressing plate 11 relative to the second control shaft 9 (see Patent Documents 1 and 2, for example).

Patent Document 1: Utility Model Publication No. 4-3196
Patent Document 2: Patent Publication No. 7-81669

DISCLOSURE OF THE INVENTION

Problem to be Solved by the Invention

In the conventional pipeline closing apparatus, a space is formed between the engaging link pairs 13 and 14 and the outer peripheral surface of the second control shaft 9, when the engaging link pairs 13 and 14 are stretched to a diameter-reduced position, for allowing a flexion to the extent that flexing pivotal connecting points S2 of the engaging link pairs 13 and 14 project toward the second control shaft 9 beyond lines extending between pivotal connecting points S1 to the second connecting elements 22 of the mounting tubular member 21 and pivotal connecting points S3 to the first connecting elements 20 of the second pressing plate 11. Therefore, when the nut 15 becomes loose, or an error occurs in an initial position set by the nut 15, or excessive clattering occurs with each of the pivotal connecting points of the engaging link pairs 13 and 14, the flexing pivotal connecting points S2 of the engaging link pair 13 and 14 are sometimes located on the lines extending between pivotal connecting points S1 to the second connecting elements 22 of the mounting tubular member 21 and pivotal connecting points S3 to the first connecting elements 20 of the second pressing plate 11. As a result, when the second control shaft 9 is slid outward relative to the first control shaft 8, the engaging link pairs 13 and 14 may flex to a reverse condition in which the flexing pivotal connecting points S2 of the engaging link pairs 13 and 14 project toward the second control shaft 9 beyond the lines extending between pivotal connecting points S1 to the second connecting elements 22 of the mounting tubular member 21 and pivotal connecting points S3 to the first connecting elements 20 of the second pressing plate 11. Such a reverse condition of the engaging link pairs 13 and 14 will result in the loss of the desired engaging function of the engaging link pairs 13 and 14.

The present invention has been made having regard to the state of the art noted above, and its primary object is to provide a pipeline closing apparatus capable of performing a desired engaging function of engaging link pairs reliably and effectively at all times even when any components of a retaining device become loose or are set in error.

Means for Solving the Problem

A first characteristic feature of the present invention lies in a pipeline closing apparatus comprising a lid member attachable to a downstream end portion of a sluice valve or an end portion of a pipe portion connected thereto for closing an end opening of a branch pipe connected to and diverging from a fluid transmitting main and having the sluice valve disposed therein; a cylindrical first control shaft extending through the lid member to be axially slidable in sealed condition; a second control shaft extending through the first control shaft to be axially slidable; a first pressing plate attached to an inward end region of the first control shaft; a second pressing plate attached to an inward end region of the second control shaft upstream of the first pressing plate; an elastic annular member disposed between the first pressing plate and the second pressing plate and elastically deformable to a diameter-increased position for tight contact with an inner peripheral surface of the branch pipe by being clamped and pressed between both of the pressing plates from axial directions, thereby to block between the inner peripheral surface and outer peripheral portions of the pressing plates; and a retaining device provided between the inward end region of the second control shaft and the second pressing plate, and including engaging link pairs flexing and bulging to a diameter-increased position to engage with positions upstream of a position blocked by the elastic annular member in response to outward sliding movement of the second control shaft relative to the first control shaft;

wherein a reversal preventing device is provided which, when the engaging link pairs of the retaining device are stretched to a diameter-reduced position, contacts and limits the engaging link pairs to an outwardly bent position where flexing pivotal connecting points of the engaging link pairs project radially outward.

According to the above-noted characteristic construction, even if any control components for controlling the retaining device become loose, or any set-up errors are produced, or any excessive clattering occurs with each of the pivotal connecting points of the engaging link pairs when the engaging link pairs are stretched to the diameter-reduced position, for example, under the condition in which a space is defined between the engaging link pairs and an outer peripheral surface in the inward end region of the second control shaft for allowing the link pairs to flex to the extent that the flexing pivotal connecting points of the engaging link pairs project toward the second control shaft beyond lines extending between pivotal connecting points to the inward end of the second control shaft and pivotal connecting points to the upstream pressing plate, the flexing pivotal connecting points of the engaging link pairs are never positioned on the lines extending between the opposite pivotal connecting points, but the reversal preventing device is capable of contacting and limiting the engaging link pairs, at all times, to the outwardly bent position where the flexing pivotal connecting points of the engaging link pairs project radially outward.

Thus, the engaging link pairs can perform the desired engaging function reliably and effectively at all times even when any control components for controlling the retaining device become loose, or any set-up errors are produced, or any excessive clattering occurs with the pivotal connecting points of the engaging link pairs.

A second characteristic feature of the pipeline closing apparatus according to the present invention lies in that the reversal preventing device includes a tubular elastic correcting member mounted on the inward end region of the second control shaft for contacting at least one of the engaging links when the engaging link pairs stretched to the diameter-reduced position reach a predetermined outwardly bent position.

According to the above-noted characteristic construction, at least one of the engaging links contacts the tubular elastic correcting member fitted on the inward end region of the second control shaft before the flexing pivotal connecting points of the engaging link pairs reach the lines extending between the opposite pivotal connecting points when the engaging link pairs in the diameter-increased position are stretched to the diameter-reduced position, thereby to reliably maintain the link pairs in the predetermined outwardly bent position.

Thus, the tubular elastic correcting member is simply mounted on the inward end region of the second control shaft, which can simplify the overall construction and facilitate an assembling operation as well as absorbing shocks and reducing noise in time of contact with the links.

A third characteristic feature of the pipeline closing apparatus according to the present invention lies in that the reversal preventing device includes a ring-shaped elastic correcting member for contacting one of the engaging links when the engaging link pairs stretched to the diameter-reduced position reach the predetermined outwardly bent position, the elastic correcting member being mounted on a mounting tubular member fitted on the inward end region of the second control shaft and having a connecting element pivotably connected to an end portion of one of the engaging links.

According to the above-noted characteristic construction, one of the engaging links pivotably connected to the connecting element of the mounting tubular member contacts the ring-shaped elastic correcting member mounted on the mounting tubular member fitted on the inward end region of the second control shaft before the flexing pivotal connecting points of the engaging link pairs reach the lines extending between the opposite pivotal connecting points when the engaging link pairs in the diameter-increased position are stretched to the diameter-reduced position, thereby to reliably maintain the link pairs in the predetermined outwardly bent position.

Thus, the ring-shaped elastic correcting member is simply mounted on the mounting tubular member for pivotably connecting one of the engaging links thereto, which can eliminate the need for securing a large space for providing the elastic correcting member to simplify the overall construction and facilitate an assembling operation as well as absorbing shocks and reducing noise in time of contact with the links.

A fourth characteristic feature of the pipeline closing apparatus according to the present invention lies in that the elastic annular member is shaped cylindrical and has an axially middle portion larger in diameter than axially opposite end portions.

According to the above-noted characteristic construction, when the cylindrical elastic annular member disposed between the pair of pressing plates is elastically deformed to a diameter-increased position by being clamped and pressed by these pressing plates from axial directions, the operational resistance at the time of compression is reduced by an amount corresponding to the reduced diameter at the axially opposite end portions of the elastic annular member. On the other hand, the axially middle portion of the elastic annular member is larger in diameter than the axially opposite end portions, which can secure an amount of deformation to increase the diameter as the entire elastic annular member.

A fifth characteristic feature of the pipeline closing apparatus according to the present invention lies in that the axially middle portion of the elastic annular member has an outer peripheral surface which is shaped partly spherical to project most outwardly at an axial middle part thereof.

According to the above-noted characteristic construction, since the axially opposite end portions of the elastic annular member are smaller in diameter and the outer peripheral surface of the axially middle portion of the elastic annular member is shaped partly spherical to project most outwardly at the axially middle part thereof when the cylindrical elastic annular member disposed between the pair of pressing plates is elastically deformed to the diameter-increased position by being clamped and pressed by the pressing plates from axial directions, the operational resistance at the time of compression is reduced. On the other hand, the axially middle portion of the elastic annular member is larger in diameter than the axially opposite end portions, which can secure an amount of deformation to increase the diameter as the entire elastic annular member.

A sixth characteristic feature of the pipeline closing apparatus according to the present invention lies in that both of the pressing plates include annular holding portions to be in contact with outer circumferential surfaces of the axially opposite end portions of the cylindrical elastic annular member.

According to the above-noted characteristic construction, the annular holding portions formed on both of the pressing plates bite into a bulging portion of the elastic annular member bulging radially outwardly when the cylindrical elastic annular member disposed between the pressing plates is elastically deformed to the diameter-increased position by being clamped and pressed by the pressing plates from axial directions. As a result, the elastic annular member is reliably prevented from being dislocated by fluid pressure.

A seventh characteristic feature of the pipeline closing apparatus according to the present invention lies in that the large diameter middle portion of the elastic annular member has an inner peripheral surface that is shaped partly spherical to project most outwardly at an axially middle part thereof.

According to the above-noted characteristic construction, since the axially opposite end portions of the elastic annual member are smaller in diameter and the outer peripheral surface and inner peripheral surface of the large diameter middle portion are shaped partly spherical to project most outwardly at the axial middle parts thereof, respectively, the operational resistance at the time of compression can be significantly reduced when the cylindrical elastic annular member disposed between the pressing plates is elastically deformed to the diameter-increased position by being clamped and pressed by the pressing plates from axial directions.

BEST MODE FOR CARRYING OUT THE INVENTION

First Embodiment

A pipeline closing apparatus A and a valve changing method using the pipeline closing apparatus A will be described hereinafter with reference to the drawings. The pipeline closing apparatus A is used when changing a sluice valve 6 disposed on a branch pipe P2 for a new sluice valve 6 while water supply is continued through a water main P1 and yet water leakage from the branch pipe P2 is prevented.

FIG. 1 illustrates a branch pipe connecting construction provided in an intermediate position along a fluid transmitting line. In this branch pipe connecting construction, a diverging pipe portion 1 projects from, and is formed integrally with, a midway position of the water main P1 which is an example of fluid transmitting mains. The diverging pipe portion 1 includes a connecting flange 1A to which a connecting lid member 2 with a connecting pipe portion 2A having a diameter smaller than the inside diameter of the connecting flange 1A is detachably and fixedly connected in sealed condition by bolts 3 and nuts 4. A connecting flange 2B is formed on the connecting pipe portion 2A of the connecting lid member 2. A diverging pipe 5 having connecting flanges 5A and 5B provided at opposite ends thereof and a sluice valve 6 having connecting flanges 6A and 6B provided at opposite ends thereof are detachably and fixedly connected to the connecting flange 2B in sealed condition by bolts 3 and nuts 4, respectively. The branch pipe P2 is constituted by the diverging pipe portion 1 of the water main P1, the connecting lid member 2, the diverging pipe 5 and the sluice valve 6. An implement such as an air valve VA or a fireplug, or a water pipe or the like is detachably and fixedly connected in sealed condition to the downstream connecting flange 6B of the sluice valve 6. In this embodiment, the side of the branch pipe P2 adjacent the water main P1 is called upstream side.

As shown in FIGS. 1 through 11, a bottomed tubular lid member 7 is connected in sealed condition to the downstream connecting flange 6B of the sluice valve 6 to close an end opening of the branch pipe P2. The bottomed tubular lid member 7 includes a connecting flange 7A to be connected in sealed condition to the downstream connecting flange 6B, and a bottom wall portion 7B having a cylindrical first control shaft 8 extending through a central portion of the bottom wall portion 7B to be axially slidable in sealed condition and a second control shaft 9 extending through the first control shaft 8 to be axially slidable. The first control shaft 8 and second control shaft 9 have, provided at inward end regions thereof, a closing device C for blocking (shutting off) the fluid passage of the branch pipe P2, i.e. the fluid passage in the connecting pipe portion 2A of the connecting lid member 2, and a retaining device D including engaging link pairs 13 and 14 flexing and bulging in a diameter-increased position for engaging a large diameter tubular wall portion upstream of the position blocked by the closing device G, i.e. a circumferential edge of a passage opening of a lid plate portion 2C of the connecting lid member 2. In addition, a control device E is provided for the first control shaft 8 and second control shaft 9 to control the closing device C and retaining device D from outside through both of the control shafts 8 and 9.

The closing device C will be described next.

As shown in FIGS. 2 and 11, the first control shaft 8 has a first pressing plate 10 fixedly fitted on the inward end thereof. The first pressing plate 10 includes an annular pressing surface 10A, and a hollow portion 10B opening in a coaxial circle toward a distal end. The second control shaft 9 has a second pressing plate 11 axially slidably fitted on the inward end region thereof. The second pressing plate 11 includes an annular pressing surface 11A axially opposed to the pressing face 10A of the first pressing plate 10, and a tubular portion 11B axially slidable into the hollow portion 10B of the first pressing plate 10. Further, a stopper nut 15 and a lock nut 16 are screwed to a threaded shaft portion 9a formed on the inward end region of the second control shaft 9 to determine a maximum upstream movement position of the second pressing plate 11 relative to the second control shaft 9. In this embodiment, the sides of the first control shaft 8 and second control shaft 9 adjacent the water main P1 are referred to as the inward end sides of the first control shaft 8 and second control shaft 9, respectively.

The outside diameters of the first pressing plate 10 and second pressing plate 11 are smaller than an inside diameter of the connecting pipe portion 2A of the connecting lid member 2 constituting part of the branch pipe P2 so that the plates in an accommodating chamber 7C of the lid member 7 may be advanced into and retracted from the connecting pipe portion 2A of the connecting lid member 2 through the sluice valve 6 and the diverging pipe 5. In other words, the outer diameters of the first pressing plate 10 and second pressing plate 11 are smaller than an inside diameter of a fluid passage 6D through a ball valve member 6C of the sluice valve 6 which the smallest inside diameter among those of all the components of the branch pipe P2.

Further, an elastic annular member 12 made of urethane rubber is fitted on the tubular portion 11B of the second pressing plate 11. The elastic annular member 12 has an outside diameter smaller than the inside diameter of the fluid passage 6D through the ball valve member 6C of the sluice valve 6 in a non-pressurized condition (natural condition), and is elastically deformable to a diameter-increased position in tight contact with an inner peripheral wall surface of the connecting pipe portion 2A of the connecting lid member 2 by being axially clamped and pressed between both of the pressing surfaces 10A and 11A of the pressing plates 10 and 11, thereby to block between the inner peripheral wall surface and outer peripheral portions of the pressing plates 10 and 11.

The elastic annular member 12 has a cylindrical shape to be mounted tight on the tubular portion 11B of the second pressing plate 11, and has an axially middle portion 12a that is larger in diameter than axially opposite end portions 12b. The large diameter middle portion 12a has an outer peripheral surface 12d which is shaped partly spherical to protrude most outwardly at an axially middle part thereof. Further, each of the small diameter opposite end portions 12b has an outer peripheral end surface portion 12c at an end surface thereof shaped as an annular inclined surface that is inclined by a predetermined angle (30 degrees in the present embodiment) relative to a vertical plane perpendicular to the axis.

The pressing surface 10A of the first pressing plate 10 includes an outer peripheral end surface portion 10a while the pressing surface 11A of the second pressing plate 11 includes an outer peripheral end surface portion 11a, respectively. Each of the outer peripheral end surface portions 10a and 11a is formed as an annular inclined pressing surface having the further radially outward portion located the closer to the axially middle position of the elastic annular member 12, so as to make tight contact axially with the outer peripheral end surface portion 12c of each of the opposite end surfaces of the elastic annular member 12. In addition, annular holding portions 10C and 11C are formed in an outer circumferential edge side of the pressing surface 10A of the first pressing plate 10 and an outer circumferential edge side of the pressing surface 11A of the second pressing plate 11 to be in contact with and fitted on outer circumferential surfaces of the axially opposite end portions 12b of the elastic annular member 12.

Each of the axially opposite end portions 12b of the elastic annular member 12 has a small diameter and the outer peripheral surface 12d of the axially middle portion 12a is shaped partly spherical to protrude most outwardly at the axially middle part thereof. Thus, when the elastic annular member 12 disposed between the pressing plates 10 and 11 is elastically deformed to the diameter-increased position by being axially clamped and pressed by the pressing plates 10 and 11, an operational resistance is reduced in time of compression, and yet a sufficient amount of diameter-increasing deformation can be secured for the entire elastic annular member 12 since the axially middle portion 12a of the elastic annular member 12 is larger in diameter than the axially opposite end portions 12b.

Moreover, as shown in FIGS. 10 and 11, when the cylindrical elastic annular member 12 disposed between the pressing plates 10 and 11 is elastically deformed to the diameter-increased position by being clamped and pressed by the pressing plates 10 and 11 from axial directions, the annular holding portions 10C and 11C bite into bulging portions of the elastic annular member 12 bulging radially outward. As a result, the elastic annular member 12 is reliably and firmly prevented from being dislocated due to a water pressure of tap water flowing through the water main P1.

Next, the retaining device D will be described.

As shown in FIGS. 2 and 9, the upstream engaging links 13 and downstream engaging links 14 constitute the engaging link pairs. First plate-like connecting elements 20 are fixed to three circumferential positions of an upstream end surface of the second pressing plate 11. Ends of the downstream engaging links 14 are pivotably connected to the first connecting elements 20. Second plate-like connecting elements 22 are fixed to three circumferential positions at outer peripheries of a mounting tubular member 21 slidably fitted on the threaded shaft portion 9a formed on the inward end region of the second control shaft 9. Ends of the upstream engaging links 13 are pivotably connected to the second connecting elements 22. Further, a stopper nut 23 is screwed to a distal end of the inward threaded shaft portion 9a of the second control shaft 9 to determine a maximum upstream movement position of the mounting tubular member 21.

The engaging link pairs 13 and 14 are pivotably connected between the three pairs of the first and second connecting elements 20 and 22 axially opposed to each other, respectively, of the first connecting elements 20 of the second pressing plate 11 and the second connecting elements 22 of the mounting tubular member 21 As shown in FIGS. 7 through 9, the engaging link pairs 13 and 14 are flexed to bulge to the diameter-increased position for engaging the inner peripheral wall located upstream of the blocked portion closed by the elastic annular member 12, i.e. the circumferential edges of the passage opening of the lid plate portion 2C of the connecting lid member 2, in response to a sliding movement of the second control shaft 9 toward the outer end thereof relative to the first control shaft 8. As shown in FIG. 2, a reversal preventing device F is provided which, when the engaging link pairs 13 and 14 of the retaining device D are stretched to a diameter-reduced position, contacts and limits the engaging link pairs 13 and 14 to an outwardly bent position with flexing pivotal portions S2 of the engaging link pairs 13 and 14 protruding radially outward. More particularly, in the outwardly bent position, the flexing pivotal connecting points S2 of the engaging link pairs 13 and 14 are positioned to protrude radially outward beyond lines Y extending between pivotal connecting points S1 to the second connecting elements 22 of the mounting tubular member 21 and pivotal connecting points S3 to the first connecting elements 20 of the second pressing plate 11.

The reversal preventing device F includes an tubular elastic correcting member 24 acting as an elastic limiting element for first contacting the engaging links 13 stretched to the diameter-reduced position, and a correcting flange 25 of the mounting tubular member 21 acting as a rigid limiting element for contacting the engaging links 13 having contacted the tubular elastic correcting member 24.

As shown in FIG. 2, in constituting the reversal preventing device F, the tubular elastic correcting member 24 made of rubber is fitted on the inward threaded shaft portion 9a of the second control shaft 9 between the mounting tubular member 21 and the lock nut 16 to be elastically deformable to contact sides of the three upstream engaging links 13 being stretched to the diameter-reduced position. The correcting flange 25 is formed integrally with a downstream end of the mounting tubular member 21 to contact the sides of the three upstream engaging links 13 stretching and oscillating radially inward while locally elastically compressing the tubular elastic correcting member 24, thereby to receive the upstream engaging links 13 in the outwardly bent position defining a predetermined limit at a minimum distance to the lines Y.

Next, the control device E will be described.

As shown in FIGS. 3 and 4, the first control shaft 8 includes an elongated control body tubular shaft 8A having a mounting shaft portion 8a at an inward end side thereof fixedly fitted to a mounting tubular portion 10D of the first pressing plate 10 from the axial direction, and a control extension tubular shaft 8B fixedly fitted on an outward end side of the control body tubular shaft 8A. The control extension tubular shaft 8B has an inner peripheral surface 8b formed as an equilateral hexagonal inner peripheral surface with different diameters.

The second control shaft 9 includes an elongated control body shaft 9A having the inward end threaded shaft portion 9a, and a control extension shaft 9B fixedly screwed to an outward end portion of the control body shaft 9A. The control extension shaft 9B has an outward end threaded shaft portion 9b on which a control screw member 30 is screwed to contact an end portion of the control extension tubular shaft 8B of the first control shaft 8 through a thrust bearing 29, and a large diameter angular shaft portion 9c with an equilateral hexagonal outer peripheral surface fitted on the control extension tubular shaft 8B of the first control shaft 8 to be unrotatable relative thereto and slidable only in the axial direction.

As shown in FIGS. 10 and 11, when the control screw member 30 is screwed in a tightening direction, the first control shaft 8 is slidingly pushed inward relative to the second control shaft 9 to move the first pressing plate 10 toward the second pressing plate 11, thereby to clamp and press the elastic annular member 12 in the non-compressed condition. Then, the elastic annular member 12 is elastically deformed to the diameter-increased position in tight contact with the inner peripheral wall surface of the connecting pipe portion 2A of the connecting lid member 2, thereby to block and seal between the inner peripheral wall surface of the connecting pipe portion 2A and the outer peripheries of the pressing plates 10 and 11.

A pair of first presser control rods 31 are detachably fitted on and held by the control extension tubular shaft 8B of the first control shaft 8. Each of the first presser control rods 31 includes a first engaging ring 33 engageable with and disengageable from a second presser control rod 32 detachably fitted on and held by the control extension shaft 9B of the second control shaft 9 to prevent, in the engaged position, the second control shaft 9 from sliding outward relative to the first control shaft 8 against the water pressure, and a second engaging ring 35 engageable with and disengageable from one of a pair of L-shaped engageable pieces 34 fixed to the bottom wall portion 7B of the lid member 7 to prevent, in the engaged position, the first control shaft 8 from sliding outward relative to the lid member 7 against the water pressure.

The lid member 7 has a drain pipe 36 connected thereto for confirming a water stoppage. The drain pipe 36 has a tap 37 with a switch lever 37A.

A method of changing the sluice valve 6 using the pipeline closing apparatus A constructed as above will be described hereinafter.

[1] As shown in FIG. 1, the sluice valve 6 is closed and the air valve VA is removed from the connecting flange 6B of the sluice valve 6. Then, the connecting flange 7A of the lid member 7 provided for the pipeline closing apparatus A is attached.

At this time, as shown in FIG. 5, the pair of second engaging rings 35 are removed from the engageable pieces 34 of the lid member 7, with the pair of first engaging rings 33 remaining engaged with the second presser control rod 32. Both of the control shafts 8 and 9 are pulled up from the lid member 7 to place the closing device C and retaining device D in the accommodating chamber 7C of the lid member 7.

The positional relationship in the axial direction between the control shafts 8 and 9 is restricted by the two first engaging rings 33. In this state, a gap between the pressing plates 10 and 11 is set such that the elastic annular member 12 undergoes little or no compression. As a result, the elastic annular member 12 is maintained in the diameter reduced position.

[2] As shown in FIG. 6, the sluice valve 6 is opened, and the two control shafts 8 and 9 are pushed down relative to the lid member 7. The pair of second engaging rings 35 are engaged with the engageable pieces 34 of the lid member 7 to maintain the control shafts 8 and 9 in a push-in position.

At this time, the retaining device D is positioned within the diverging pipe portion 1 having a larger sectional area than the fluid passage in the connecting pipe portion 2A of the connecting lid member 2.

[3] As shown in FIG. 7, when the pair of first engaging rings 33 are removed from the second presser control rod 32, and the second presser control rod 32 is removed from the control extension shaft 9B of the second control shaft 9, the second control shaft 9 is slid outward relative to the first control shaft 8 by the water pressure of tap water flowing through the water main P1 or by the water pressure and a manual pull-up operational force. In response to this movement, the engaging links 13 and 14 pivotably connected between the first connecting elements 20 of the second pressing plate 11 and the second connecting elements 22 of the mounting tubular member 21 are flexed to bulge to the diameter-increased position.

In this state, as shown in FIGS. 8 and 9, when both of the second engaging rings 35 are removed from the engageable pieces 34 of the lid member 7 and the control shafts 8 and 9 are slid upward from the lid member 7 by the water pressure of tap water or by the water pressure and the manual pull-up operational force, the engaging link pairs 13 and 14 flexed to the diameter-increased position engage the inner peripheral wall surface positioned upstream of the position blocked by the elastic annual member 12, i.e. the circumferential edges of the passage opening of the lid plate portion 2C of the connecting lid member 2.

[4] As shown in FIGS. 10 and 11, when the control screw member 30 is manually screwed in the tightening direction, the first control shaft 8 is slidably pushed inward relative to the second control shaft 9 to move the first pressing plate 10 toward the second pressing plate 11, thereby to clamp and press the elastic annular member 12 in the diameter-reduced position. The elastic annular member 12 is elastically deformed to the diameter-increased position to make tight contact with the inner peripheral wall surface of the connecting pipe portion 2A of the connecting lid member 2, thereby to block and seal between the inner peripheral wall surface of the connecting pipe portion 2A and the outer peripheral portions of the pressing plates 10 and 11.

[5] As shown in FIGS. 10 and 12, the switch lever 37A of the tap 37 connected to the drain pipe 36 of the lid member 7 is opened to discharge water. After a water stop is confirmed with stopping of the water discharge, and after the first pressing control rods 31 and the lid member 7 are removed, the sluice valve 6 is removed from the connecting flange 5B of the diverging pipe 5. Then, a new sluice valve 6 is attached to the connecting flange 5B of the diverging pipe 5.

Second Embodiment

In the first embodiment described above, the first pressing plate 10 is moved toward the second pressing plate 11 by a manual tightening operation of the control screw member 30. Instead, as shown in FIG. 13, the first pressing plate 10 may be moved toward the second pressing plate 11 by a pair of hydraulic jacks 40.

More particularly, the pair of first presser control rods 31 are detachably fitted on and held by the control extension tubular shaft 8B of the first control shaft 8. A mounting plate 41 for the hydraulic jack 40 is attached to each of the first presser control rods 31 through bolts 42. The control extension shaft 9B of the second control shaft 9 has a generally T-shaped control arm 43 detachably screwed thereto and defining a pressure-receiving surface 43a for contacting extreme ends of piston rods 40A of the hydraulic jacks 40.

It should be noted that the other aspects of the construction are the same as those described in the first embodiment. Thus, like reference numerals are affixed to like components, and are not described.

Third Embodiment

FIG. 14 shows an improvement in the reversal preventing device F which, when the engaging link pairs 13 and 14 of the retaining device D are stretched to the diameter-reduced position, contacts and limits the engaging link pairs 13 and 14 to the outwardly bent position with the flexing pivotal portions S2 of the engaging link pairs 13 and 14 protruding radially outward. The correcting flange 25 is formed integrally with the downstream end of a metallic mounting tubular member 21 to contact the sides of the three upstream engaging links 13 stretching and oscillating radially inward, thereby to receive the upstream engaging links 13 in the outwardly bent position defining the predetermined limit at a minimum distance to the lines Y. In addition, an elastic correcting ring 45 made of urethane rubber or the like is fitted between the correcting flange 25 and the second connecting elements 22, which is elastically deformable by contacting the sides of the three upstream engaging links 13 being stretched to the diameter-reduced position.

The reversal preventing device F in the third embodiment also includes, as in the first embodiment, the elastic correcting ring 45 acting as the elastic limiting portion for first contacting the engaging links 13 stretched to the diameter-reduced position, and the correcting flange 25 of the mounting tubular member 21 acting as the rigid limiting portion for contacting the engaging links 13 having contacted the elastic correcting ring 45.

It should be noted that the other aspects of the construction are the same as those described in the first embodiment. Thus, like reference numerals are affixed to like components, and are not described.

Fourth Embodiment

FIGS. 15 and 16 show another form of the elastic annular member 12 noted above. This elastic annular member 12 is shaped cylindrical to be detachably and tightly mounted on the tubular portion 11B of the second pressing plate 11, and has the axial middle portion 12a larger in diameter than the axially opposite end portions 12b. In addition, the large diameter middle portion 12a has the outer peripheral surface 12d shaped partly spherical to protrude most outwardly at the axially middle part thereof. Further, the large diameter middle portion 12a of the elastic annular member 12 has an inner peripheral surface 12e shaped partly spherical to protrude most outwardly at the axially middle part thereof.

Each of the small diameter opposite end portions 12b has the outer peripheral end surface portion 12c at the end surface thereof shaped as the annular inclined surface that is inclined by the predetermined angle (30 degrees in the present embodiment) relative to the vertical plane perpendicular to the axis.

Each of the axially opposite end portions 12b of the elastic annular member 12 has a small diameter, and each of the outer peripheral surface 12d and inner peripheral surface 12e of the large diameter middle portion 12a is shaped partly spherical to protrude most outwardly at the axially middle part thereof. Thus, when the elastic annular member 12 disposed between the pair of pressing plates 10 and 11 is elastically deformed to the diameter-increased position by being axially clamped and pressed by the pressing plates 10 and 11, an operational resistance is reduced in time of compression.

It should be noted that the other aspects of the construction are the same as those described in the first embodiment. Thus, like reference numerals are affixed to like components, and are not described.

Fifth Embodiment

FIGS. 17 and 18 show a further form of the elastic annual member 12 noted above. This elastic annular member 12 is shaped cylindrical to be detachably and tightly mounted on the tubular portion 11B of the second pressing plate 11, and has the axially middle portion 12a larger in diameter than the axially opposite end portions 12b. In addition, the large diameter middle portion 12a has the outer peripheral surface 12d formed as a circumferential surface having a diameter equal to or substantially the same as the diameter of the annular holding portions 10C and 11C of the pressing plates 10 and 11 over the entire axial range thereof. Further, each of the small diameter opposite end portions 12b has the outer peripheral end surface portion 12c at the end surface thereof formed as the annular inclined surface inclined by the predetermined angle (30 degrees in the present embodiment) relative to the vertical plane perpendicular to the axis.

It should be noted that the other aspects of the construction are the same as those described in the first embodiment. Thus, like reference numerals are affixed to like components, and are not described.

Sixth Embodiment

The above first to fifth embodiments have been described as using the pipeline closing apparatus A in the method of changing the sluice valve 6 disposed in the branch pipe of the water pipe. The pipeline closing apparatus A may be used also in a method of changing other valves or connecting pipes than the sluice valve. A sixth embodiment will be described hereinafter with reference to the drawings, in which the pipeline closing apparatus A is used in a method of changing a butterfly valve V connected to a diverging pipe portion 52 integrally formed with and projecting from an intermediate portion along a water pipe 51. It should be noted that the construction of the pipeline closing apparatus A is the same as in the foregoing embodiments and its explanation is omitted accordingly.

FIG. 19 shows a pipe connecting construction used when a need has arisen for changing a butterfly valve V due to a malfunction or defective operation while maintaining a flow of water supply in the water pipe 51. In this pipe connecting construction, an upstream connecting flange 55A of a switch valve 55 for working is detachably and fixedly connected in sealed condition by bolts 56 or the like to a downstream connecting flange 60B of the butterfly valve V. The switch valve 55 includes a valve member 55C slidable and openable along a direction perpendicular to an axis of divergence Y to an extent of fully or substantially fully opening a fluid passage in a valve casing 60. A drill unit B includes a connecting flange 70A detachably and fixedly connected to a downstream connecting flange 55B of the working switch valve 55 by a plurality of bolts 56 and nuts 57 representing fastening elements. An upstream connecting flange 60A of the butterfly valve V is connected to a downstream connecting flange 54B of a connecting pipe 54. The connecting pipe 54 includes an upstream connecting flange 54A connected to a connecting flange 52A of the diverging pipe portion 52.

The drill unit B is driven by a prime mover such as an electric motor, an engine or the like to apply a driving rotational force and a feeding force to a drive rotary shaft 71 supported by a casing 70 to be rotatable and slidable along the axis of divergence Y. Then, a hole saw 73 fixedly connected to a connecting flange 72 provided at an extreme end of the drive rotary shaft 71 is advanced through the fluid passage in the working switch valve 55, thereby to cut off and remove the butterfly valve V together with the valve member 61 while maintaining the flow of the fluid in the water pipe 51.

A gap L between a cutting tip 73a of a cylindrical body 73A and a distal end of a center drill 73B is set so that the cutting tip 73a of the cylindrical body 73A may cut a downstream opening of a partly spherical inner peripheral wall surface 60a of the valve casing 60 after a relative movement in a diametrical direction between the two elements 73B and 61 is restricted with progress of cutting and removal of the valve member 61 by the center drill 73B.

When the operation to cut the butterfly valve V is completed, the drive rotary shaft 71 of the drill unit B is moved backward to return the hole saw 73 into an accommodating space of the casing 70. At that point, the valve member 55C of the working switch valve 55 is closed, and then the connecting flange 70A of the drill unit B is removed from the downstream connecting flange 55B of the working switch valve 55 to remove the drill unit B together with the cut valve member 61.

Subsequently, the connecting flange 7A of the lid member 7 of the pipeline closing apparatus A is detachably and fixedly connected in sealed condition by bolts 56 and nuts 57 to the downstream connecting flange 55B of the working switch valve 55, for closing and sealing the fluid passage upstream of a position where the butterfly valve V is mounted through a fluid passage W in the butterfly valve V having the valve member 61 and valve stems 62A and 62B cut and removed in part by the hole saw 73.

FIG. 20 shows a condition where the engaging link pairs 13 and 14 mounted on the pipeline closing apparatus A and flexed to the diameter-increased position are engaged with an inner peripheral wall surface, i.e. a circumferential edge of a diverging opening in the inner peripheral surface, of the water pipe 51 located upstream of the position blocked by the elastic annular member 12.

Next, when the control screw member 30 is manually screwed in the tightening direction, the first control shaft 8 is slidingly pushed inward relative to the second control shaft 9 to move the first pressing plate 10 toward the second pressing plate 11, thereby to clamp and press the elastic annular member 12 in the diameter-reduced condition. Then, the elastic annular member 12 is elastically deformed to the diameter-increased position in tight contact with the inner peripheral wall surface of the diverging pipe portion 52, thereby to block and seal between the inner peripheral wall surface of the diverging pipe portion 52 and the outer peripheries of the pressing plates 10 and 11.

Subsequently, a drain tap 37 provided for the lid member 7 is opened to discharge water. After a water stop is confirmed with stopping of the water discharge, the control device E, lid member 7, working switch valve 55, butterfly valve V and connecting pipe 54 are removed successively.

Other Embodiments (1) In each of the foregoing embodiments, the reversal preventing device F comprises the combination of the tubular elastic correcting member 24 mounted on the inward end of the second control shaft 9 and the correcting flange 25 of the mounting tubular member 21, or the combination of the elastic correcting ring 45 and the correcting flange 25 of the mounting tubular member 21. Instead, the reversal preventing device F may be formed of either one of them.

(2) In each of the foregoing embodiments, the reversal preventing device F comprises the tubular elastic correcting member 24 mounted on the inward end of the second control shaft 9 and the correcting flange 25 of the mounting tubular member 21, or the elastic correcting ring 45 and the correcting flange 25 of the mounting tubular member 21. Instead, a limiting member or members may be provided between the engaging link pairs 13 and 14 for contacting and limiting the link pairs to the predetermined outwardly bent position where the flexing pivotal connecting points of the engaging link pairs 13 and 14 protrude radially outward when the engaging link pairs 13 and 14 of the retaining device D are stretched to the diameter-reduced position.

In short, any constructions acting as the reversal preventing device F may be used as long as they can contact and limit the link pairs 13 and 14 to the predetermined outwardly bent position where the flexing pivotal portions S2 of the engaging link pairs 13 and 14 are positioned to protrude radially outward beyond the lines Y extending between the pivotal connecting points S1 to the second connecting elements 22 of the mounting tubular member 21 and the pivotal connecting points S3 to the first connecting elements 20 of the second pressing plate 11.

(3) In the first embodiment described above, the engaging link pairs 13 and 14 of the retaining device D are engageable with the pipe wall portion upstream of the position blocked by the elastic annular member 12, i.e. the circumferential edge of the passage opening of the lid plate portion 2C of the connecting lid member 2. Instead, the engaging link pairs 13 and 14 may be engageable with the circumferential opening edge of the diverging pipe portion 1 of the water main P1.

(4) The above first embodiment has been described by taking, for example, the diverging pipe portion 1 formed integrally with the water main 1 which is one example of fluid transmitting mains. However, the invention is not limited to this construction. For instance, a plurality of divided joint members may be detachably and fixedly connected to a water main as arranged circumferentially thereof, and a pipe joint may be attached to one of the joint members, which pipe joint has, projecting integrally therefrom a diverging pipe portion for communicating from a radial direction of the pipe (a direction along an axis of divergence) with a through bore formed in a peripheral wall of the water main.

(5) In the first embodiment described above, the tubular elastic correcting member 24 and the correcting flange 25 of the mounting tubular member 21 constituting the reversal preventing device F are made to contact the engaging links 13, but may be made to contact the other links 14 or both of the links 13 and 14.

INDUSTRIAL UTILITY

The pipeline closing apparatus according to the present invention may be used in a valve changing method for carrying out changing of a valve such as a sluice valve, a butterfly valve or other connecting pipe connected to a branch pipe or the like connected to and diverging from a water pipe or the like while maintaining a water supply through the water pipe.

DESCRIPTION OF THE REFERENCE NUMERALS AND SIGNS

Figure 1:
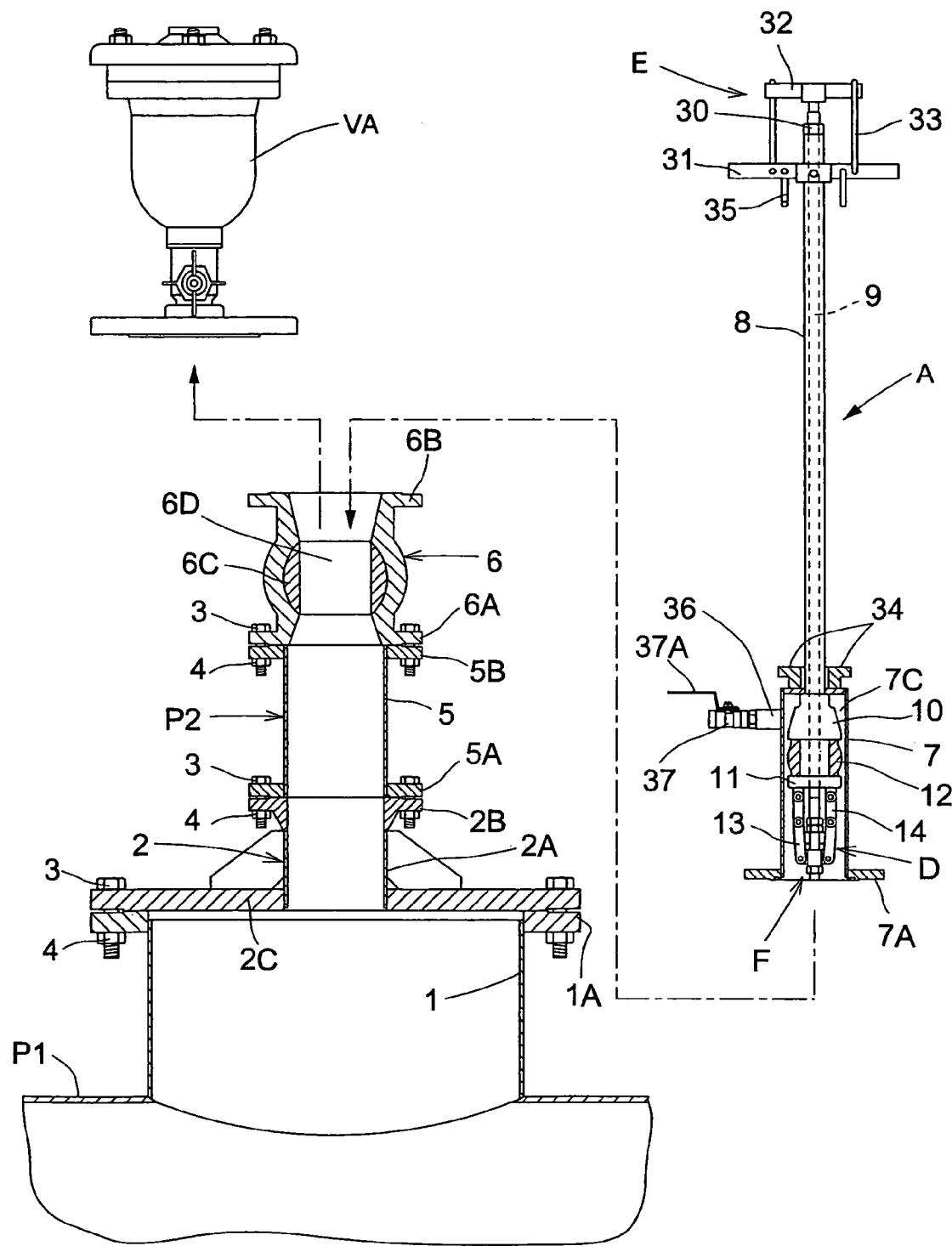
FIG. 1 Front view, partly in section, showing a first embodiment of the present invention in which an air valve is replaced by a pipeline closing apparatus.
Figure 2:
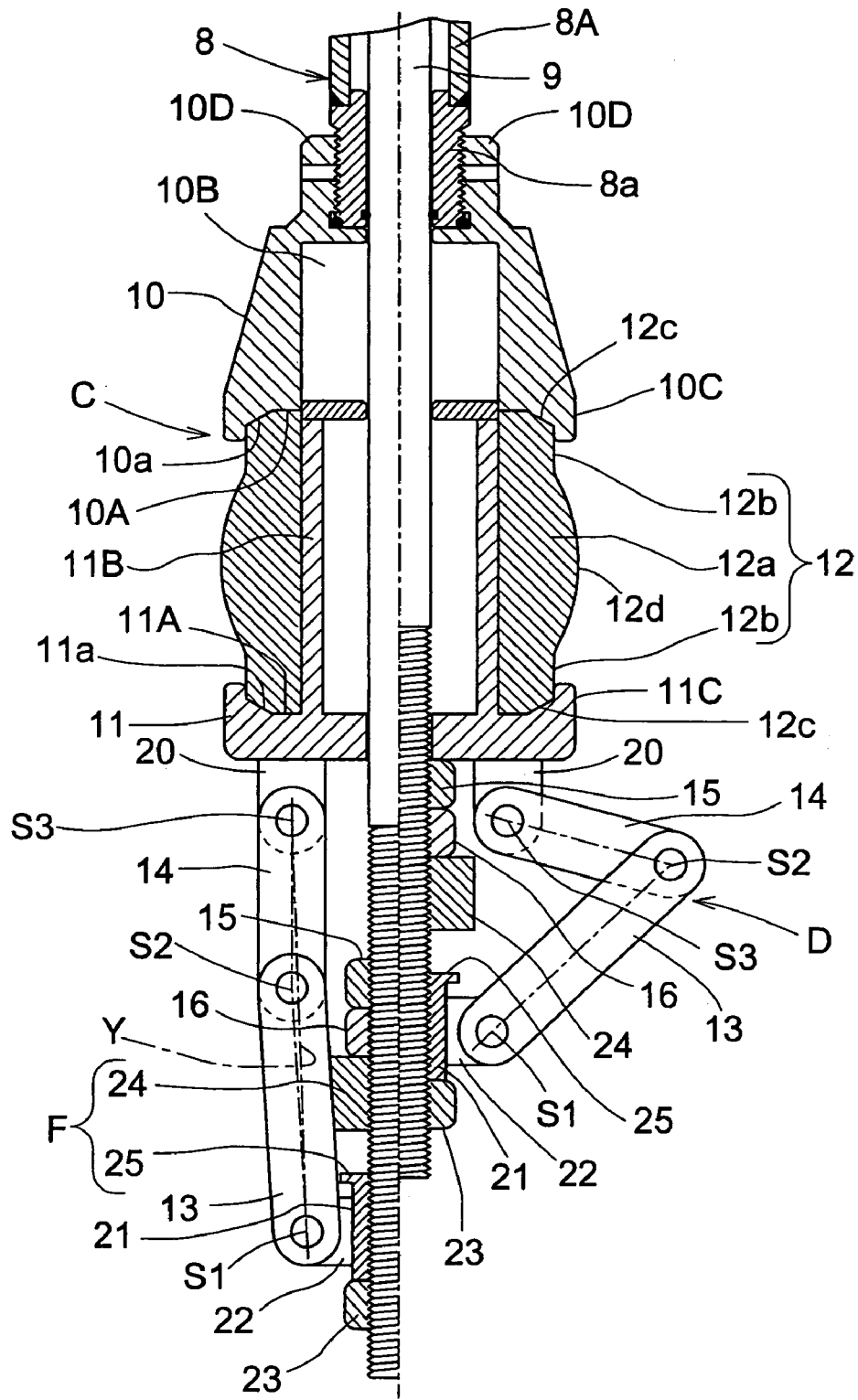
FIG. 2 Enlarged sectional front view of a closing device and a retaining device of the pipeline closing apparatus.
Figure 3:
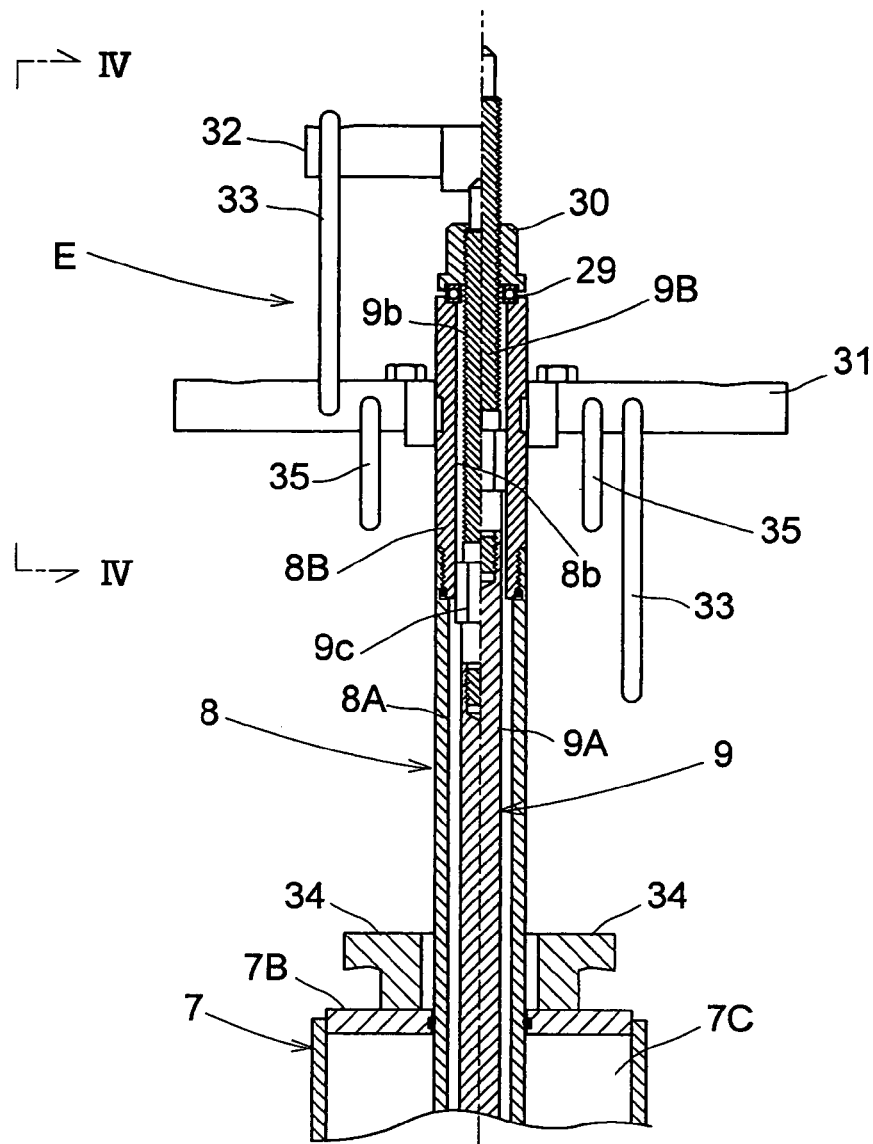
FIG. 3 Enlarged sectional front view of a control device of the pipeline closing apparatus.
Figure 4:
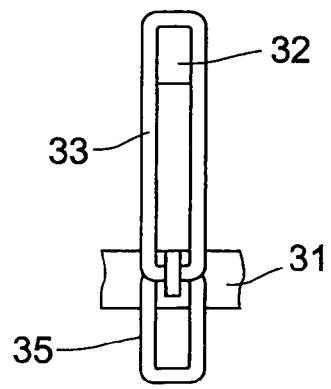
FIG. 4 Side view taken on line IV-IV in FIG. 3.
Figure 5:
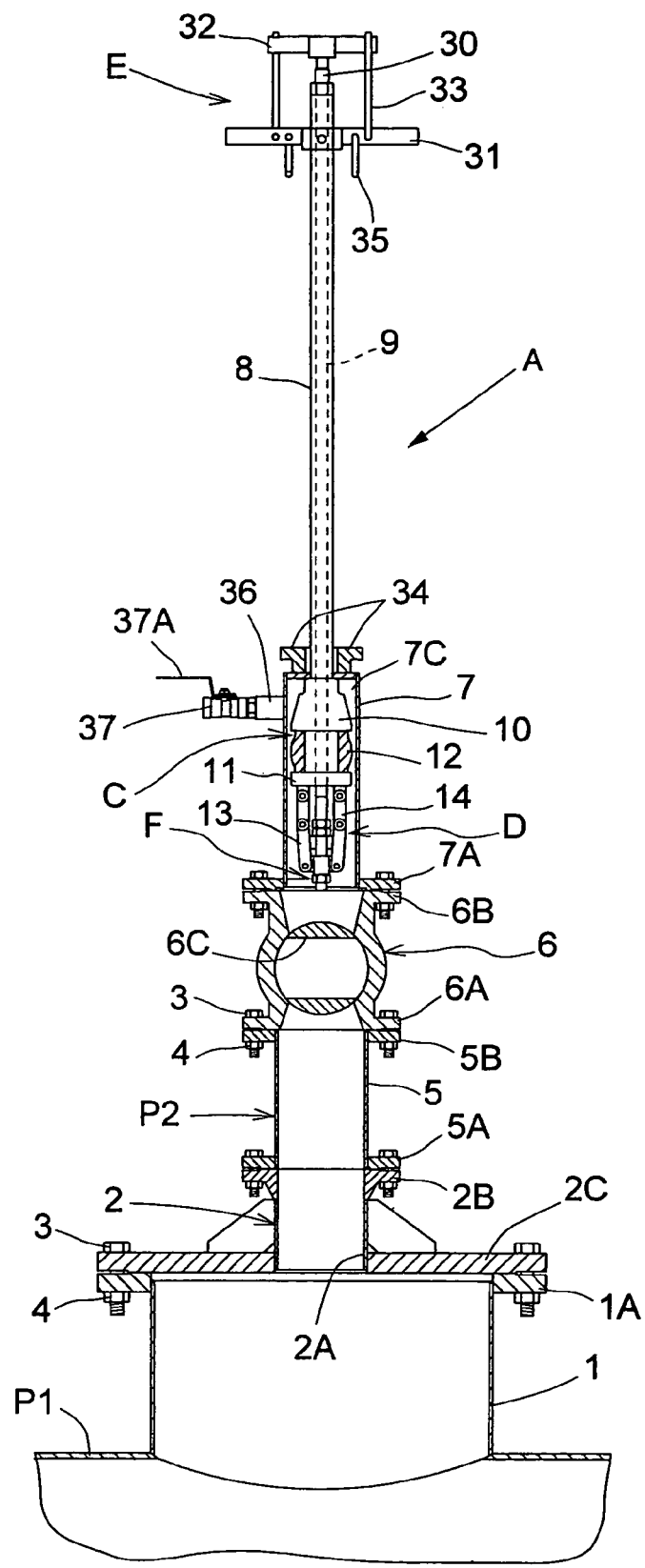
FIG. 5 Sectional front view of the pipeline closing apparatus connected to a sluice valve.
Figure 6:
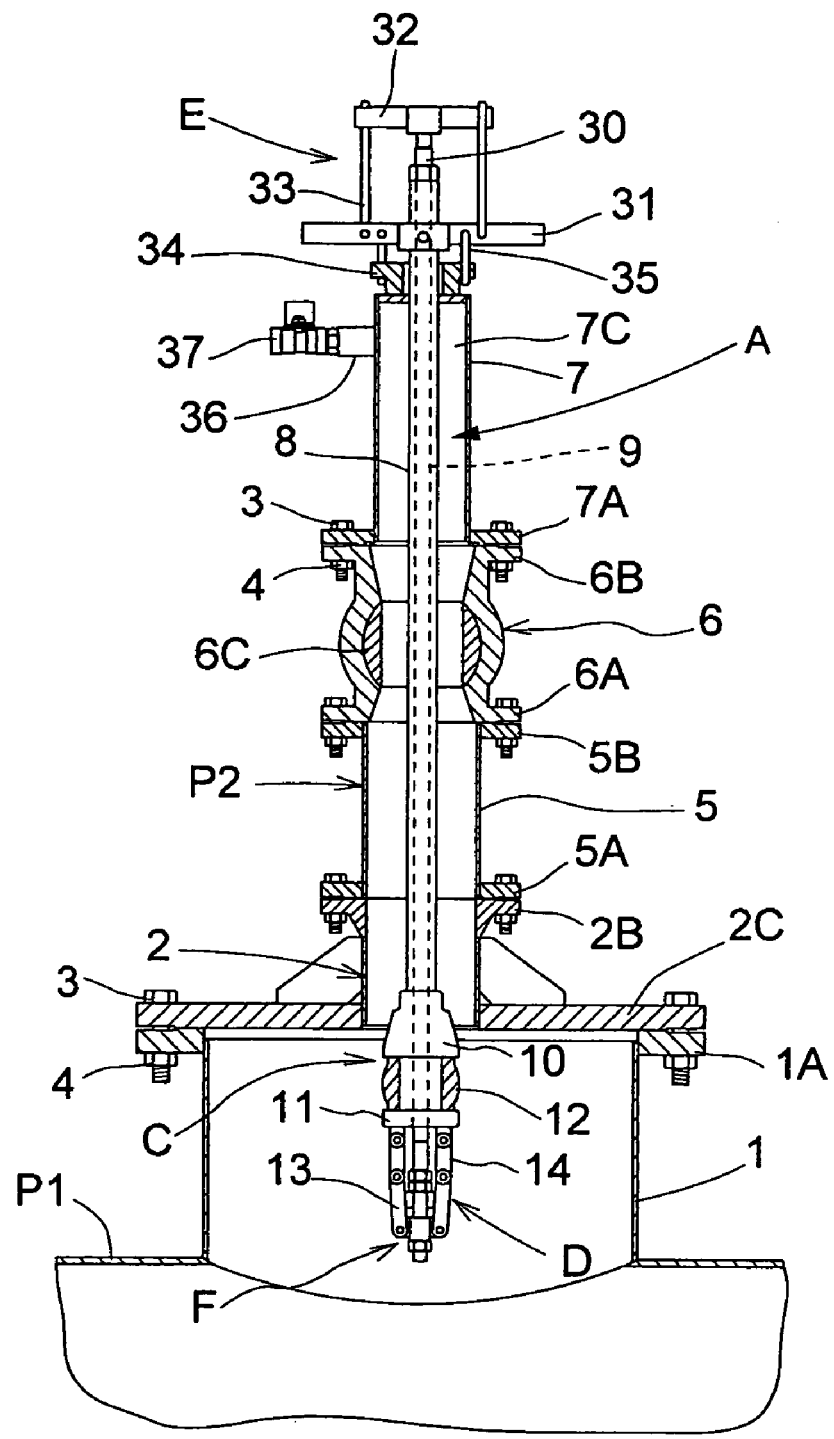
FIG. 6 Sectional front view showing the closing device and the retaining device lowered.
Figure 7:
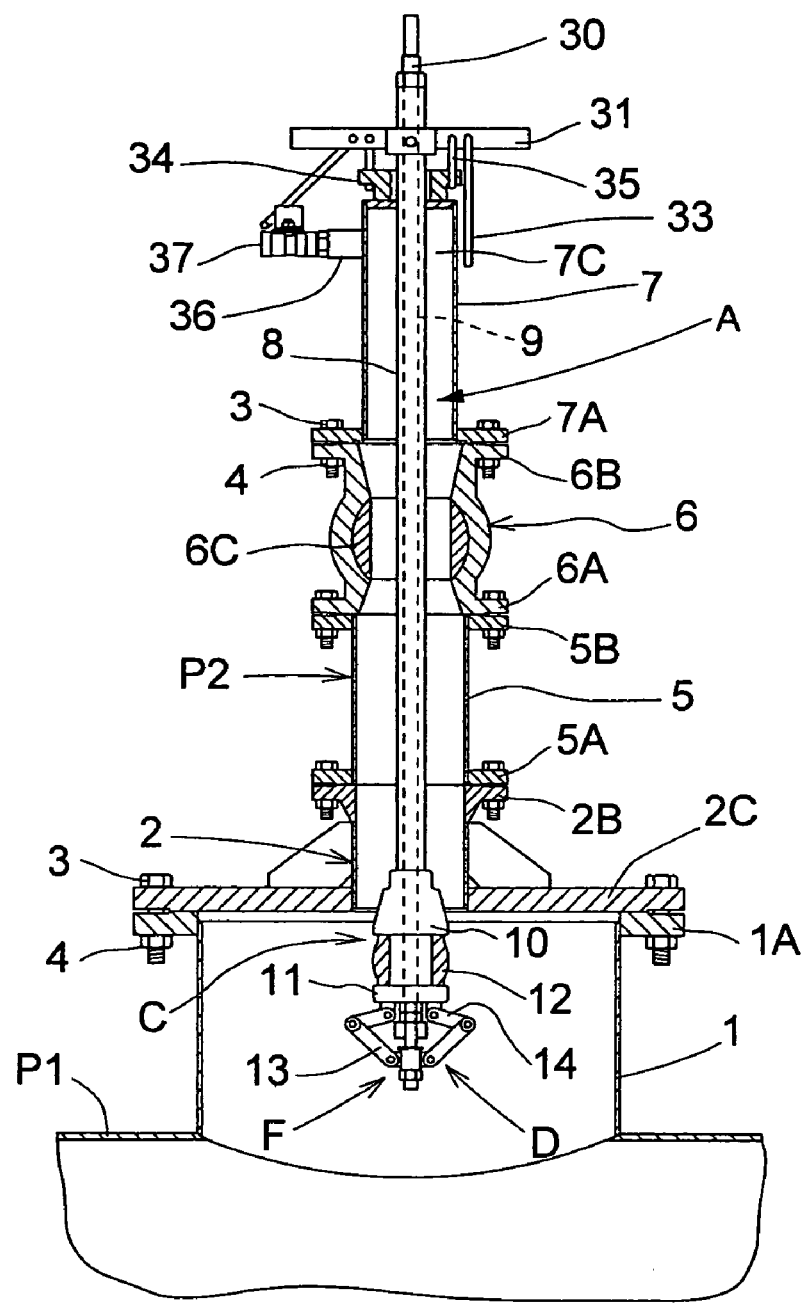
FIG. 7 Sectional front view showing engaging link pairs of the retaining device enlarged in diameter.
Figure 8:
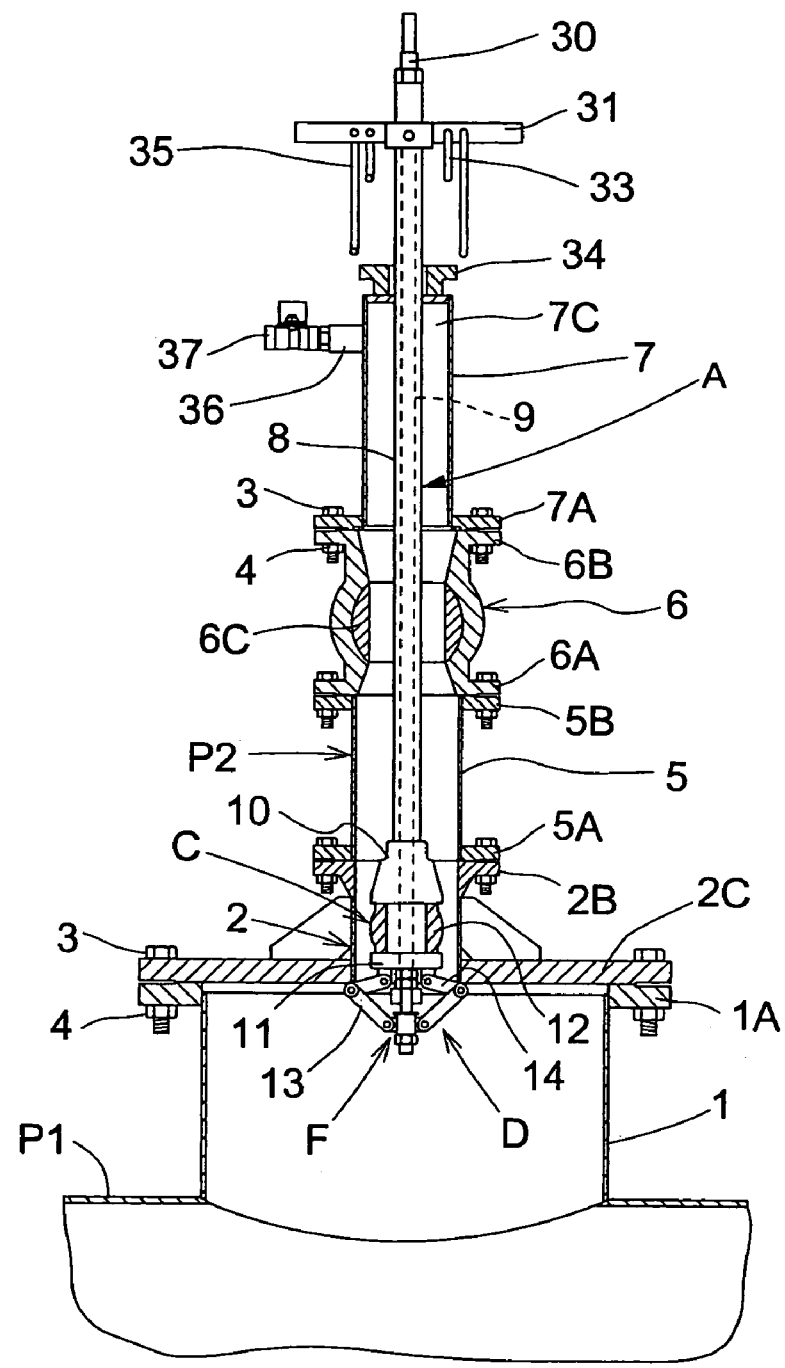
FIG. 8 Sectional front view showing the closing device and the retaining device raised to bring the engaging link pairs in a diameter-increased position to an engaged position.
Figure 9:
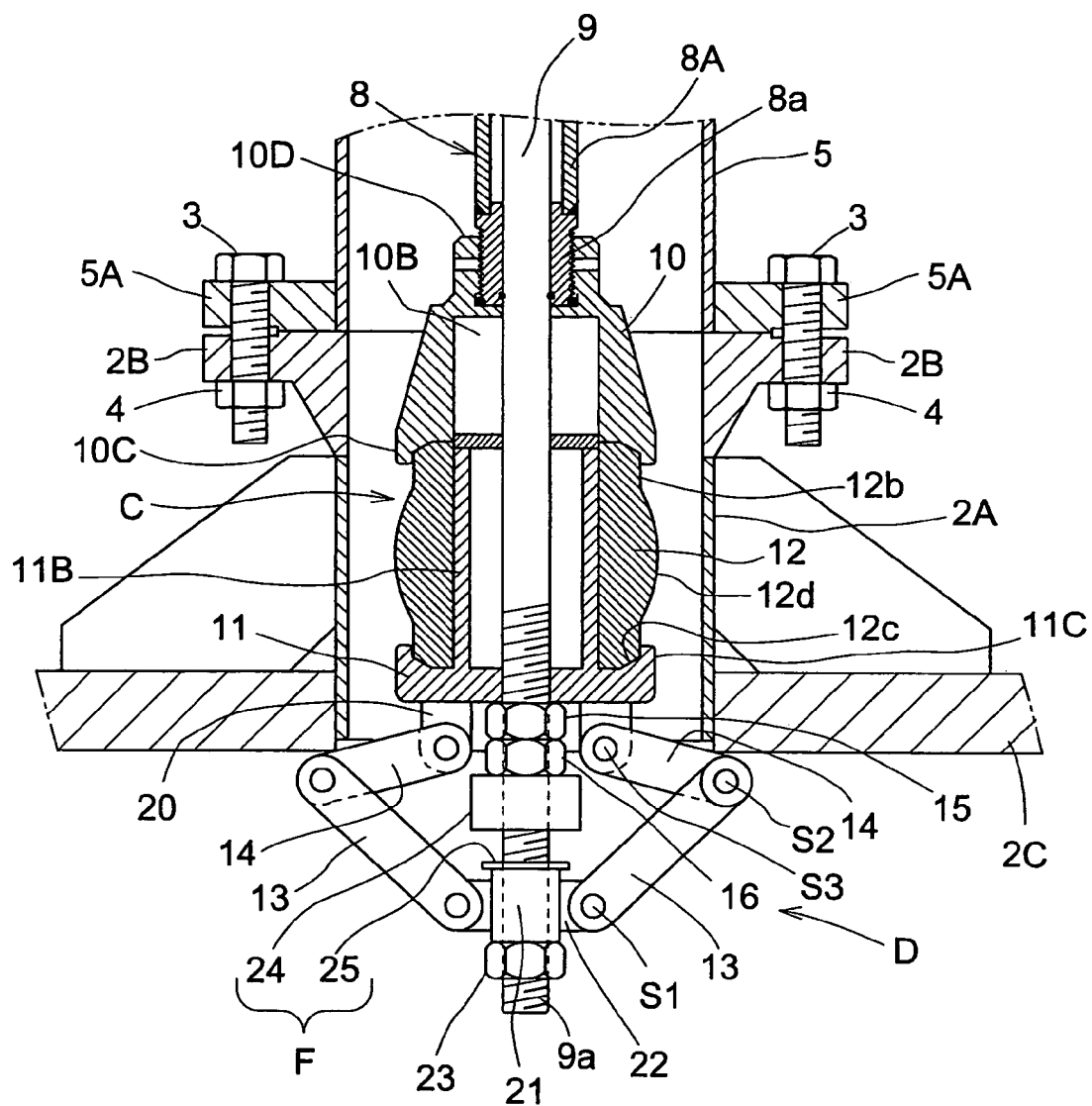
FIG. 9 Enlarged front view of a principal portion of the engaging link pairs of the retaining device in the diameter-increased position.
Figure 10:
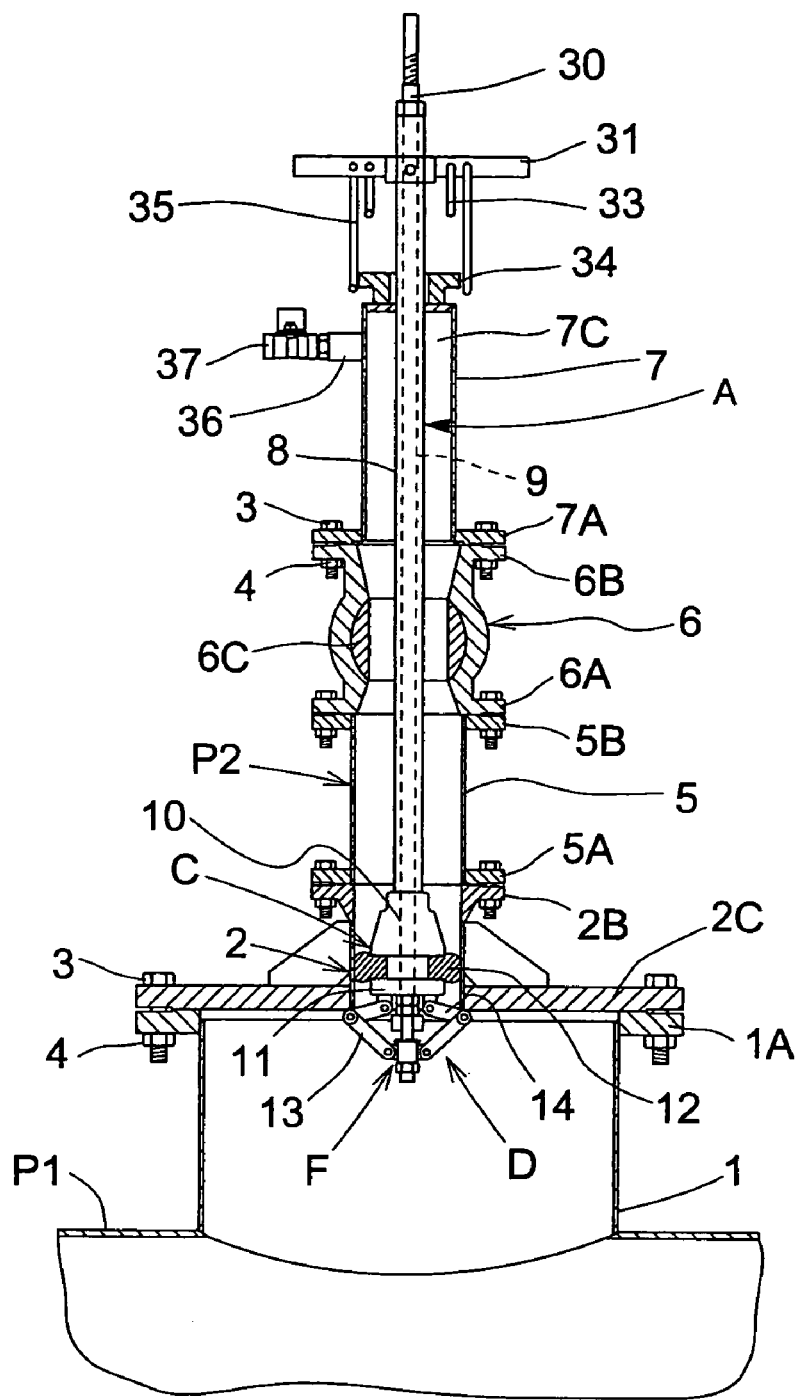
FIG. 10 Sectional front view of an elastic annular member of the closing device elastically deformed to a diameter-increased position.
Figure 11:
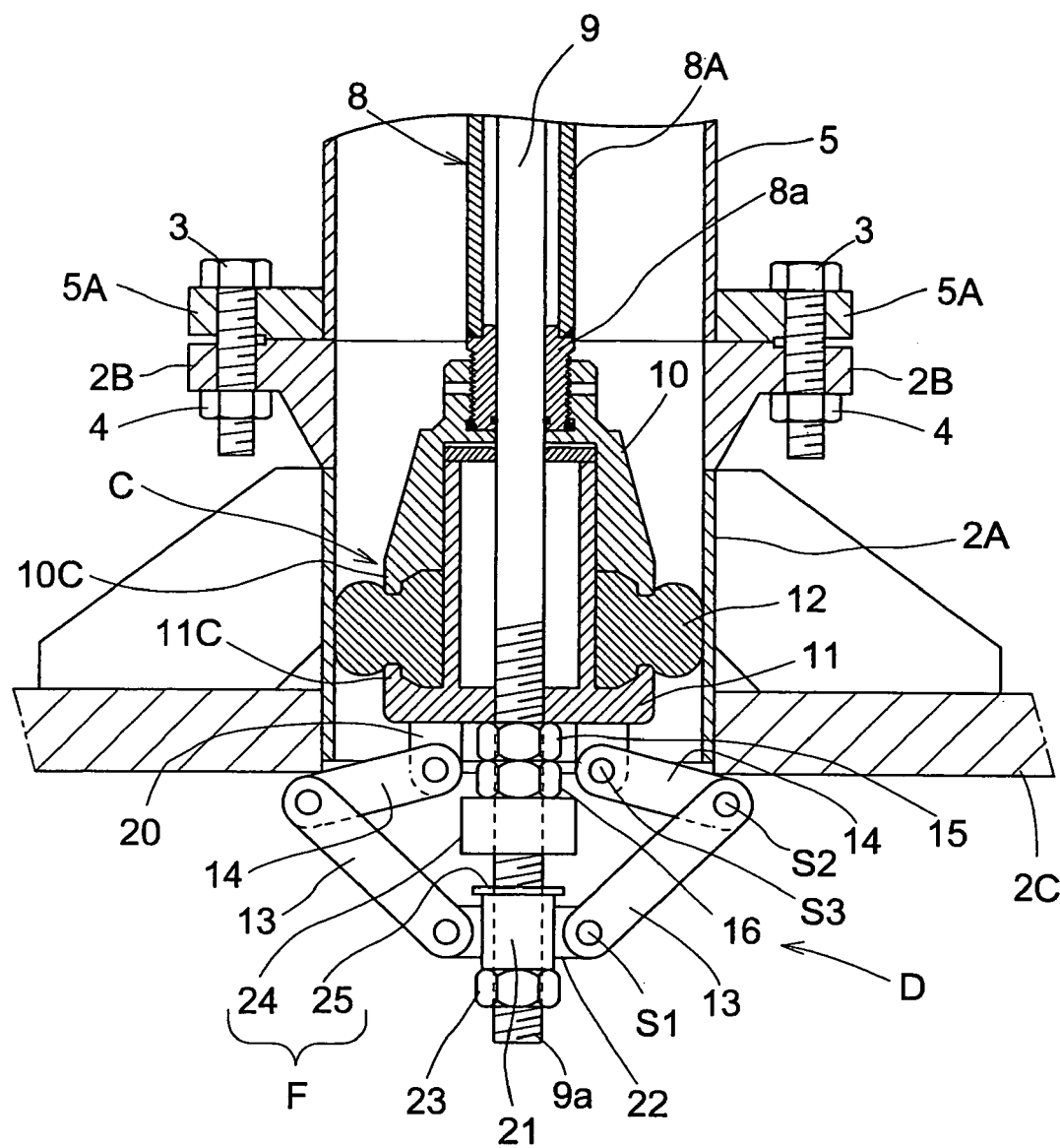
FIG. 11 Enlarged sectional front view of a principal portion of the elastic annular member of the closing device elastically deformed to the diameter-increased position.
Figure 12:
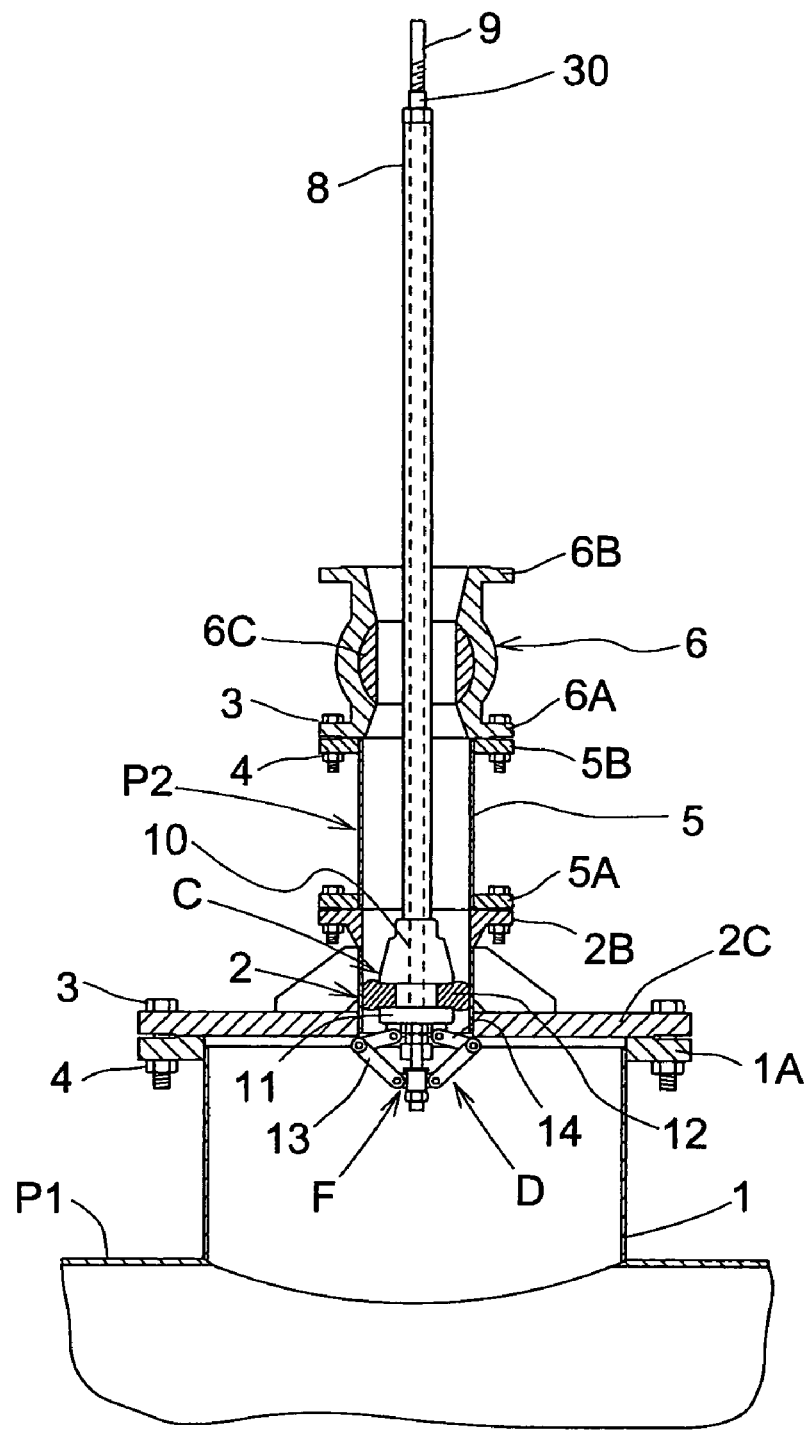
FIG. 12 Sectional front view showing a condition where first presser rods, a lid member and the sluice valve are removed.
Figure 13:
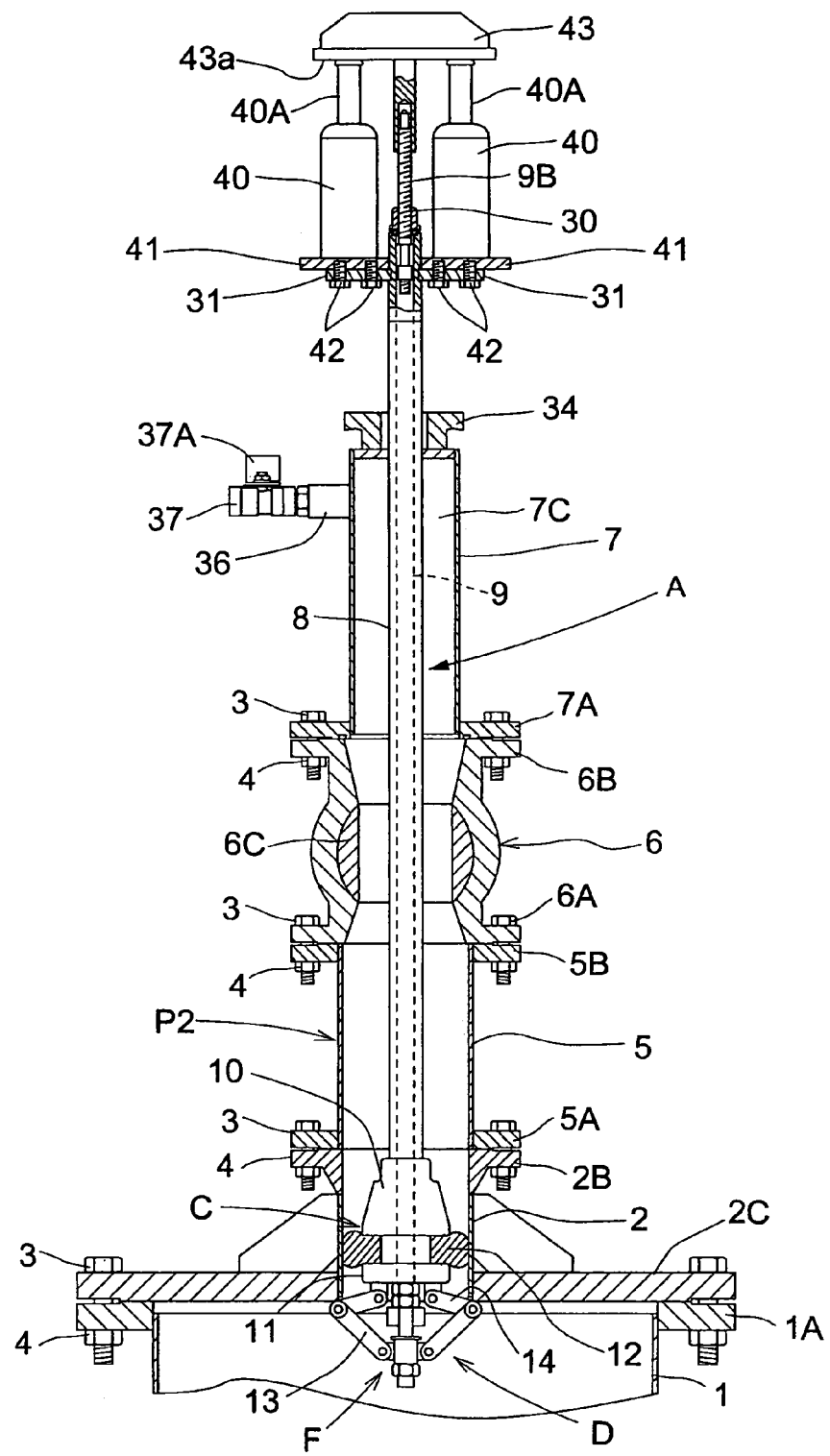
FIG. 13 Sectional front view of a pipeline closing apparatus in a second embodiment of the present invention.
Figure 14:
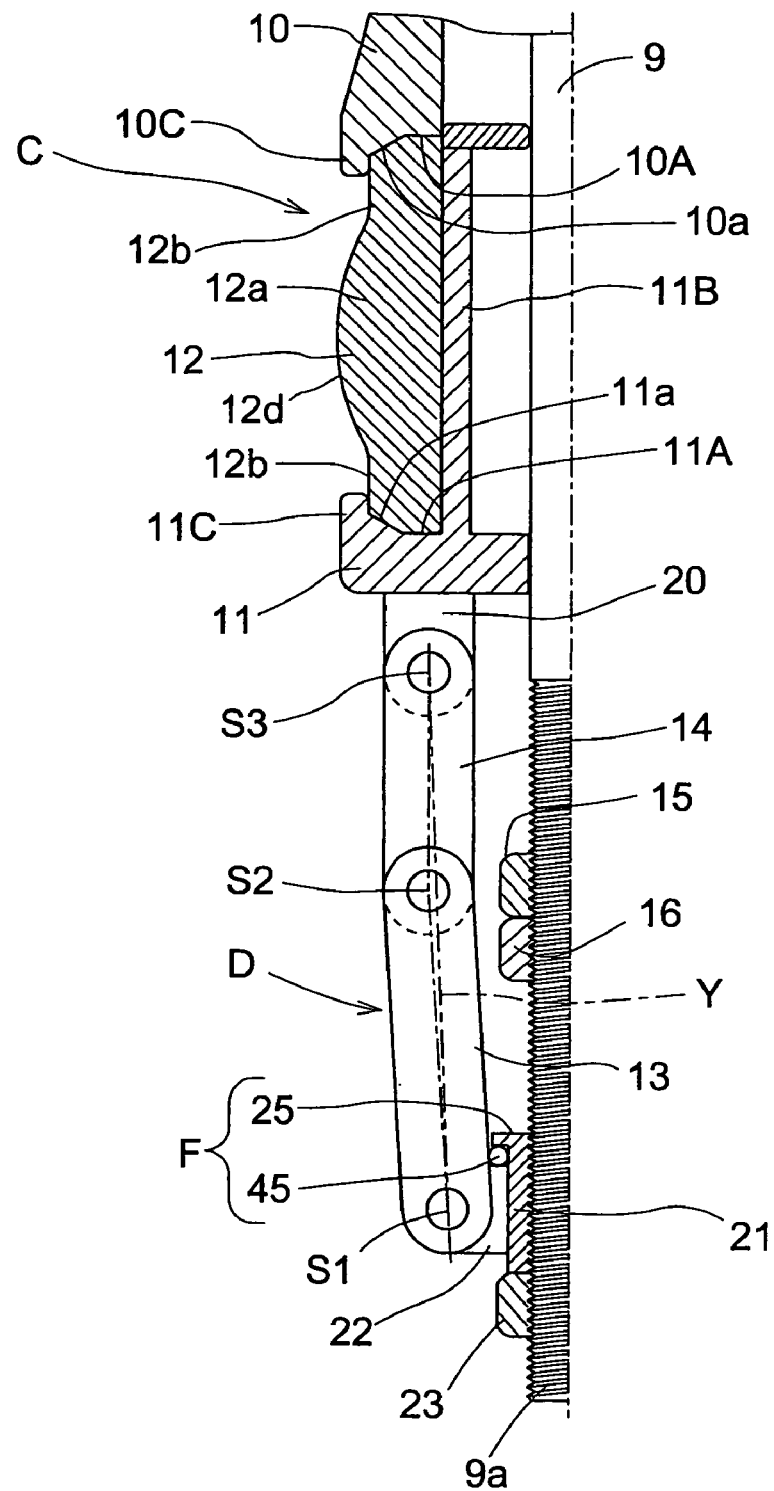
FIG. 14 Enlarged sectional view of a principal portion of a pipeline closing apparatus in a third embodiment of the present invention.
Figure 15:
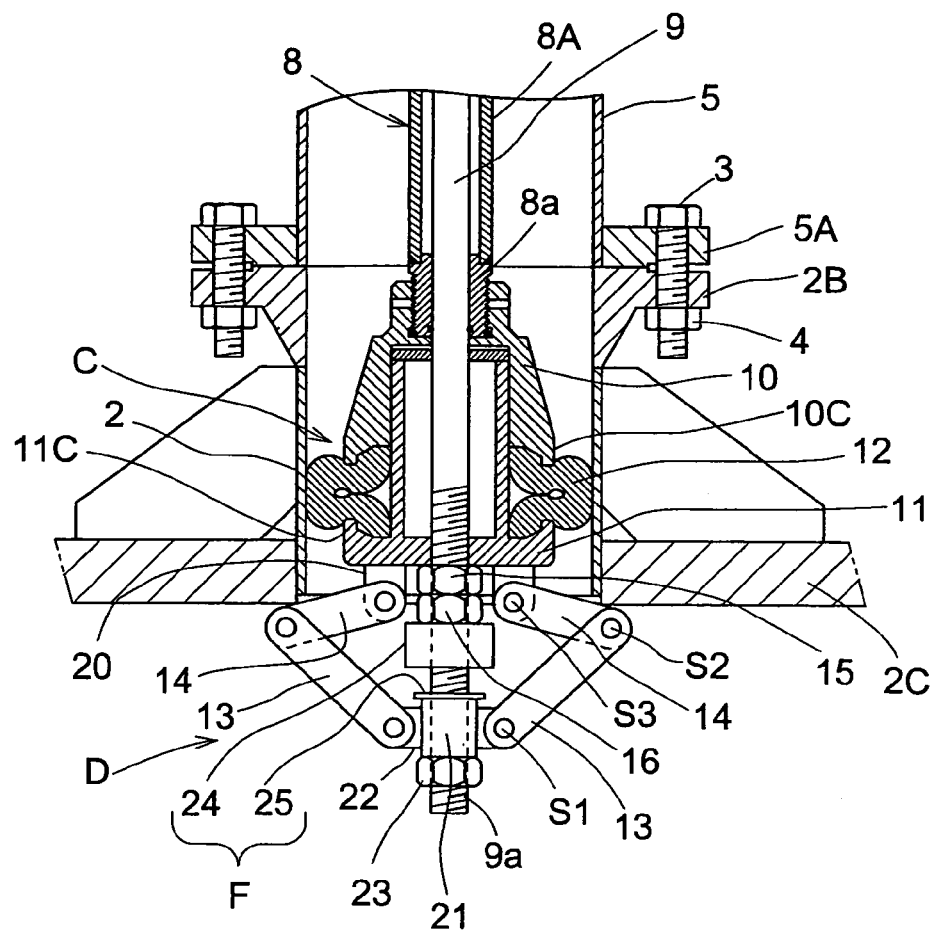
FIG. 15 Enlarged sectional view of a principal portion of a pipeline closing apparatus in a fourth embodiment of the present invention.
Figure 16:
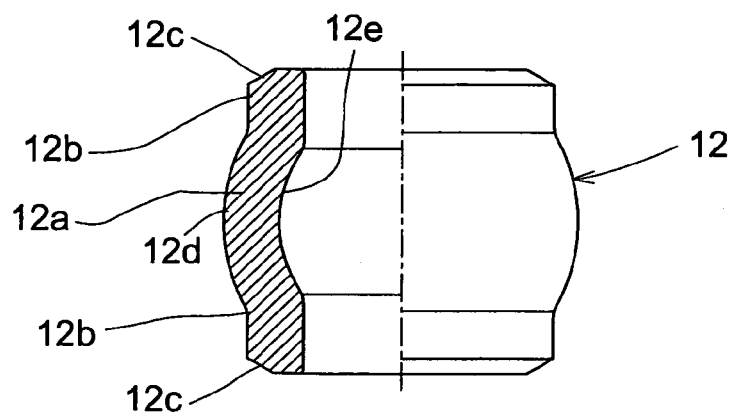
FIG. 16 Enlarged sectional view of an elastic annular member.
Figure 17:
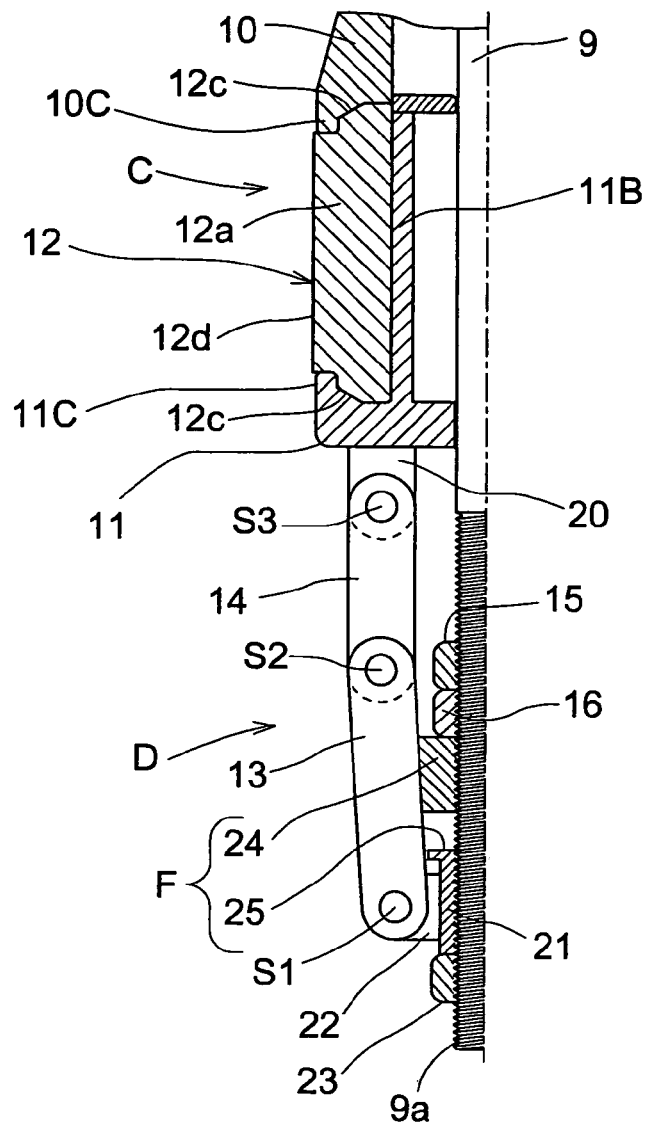
FIG. 17 Enlarged sectional view of a principal portion of a pipeline closing apparatus in a fifth embodiment of the present invention.
Figure 18:
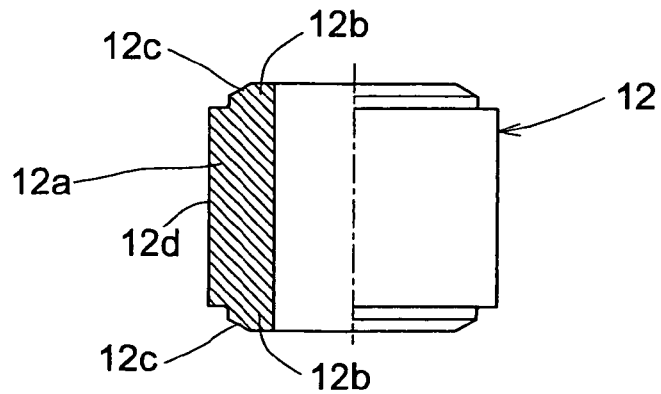
FIG. 18 Enlarged sectional view of an elastic annular member.
Figure 19:
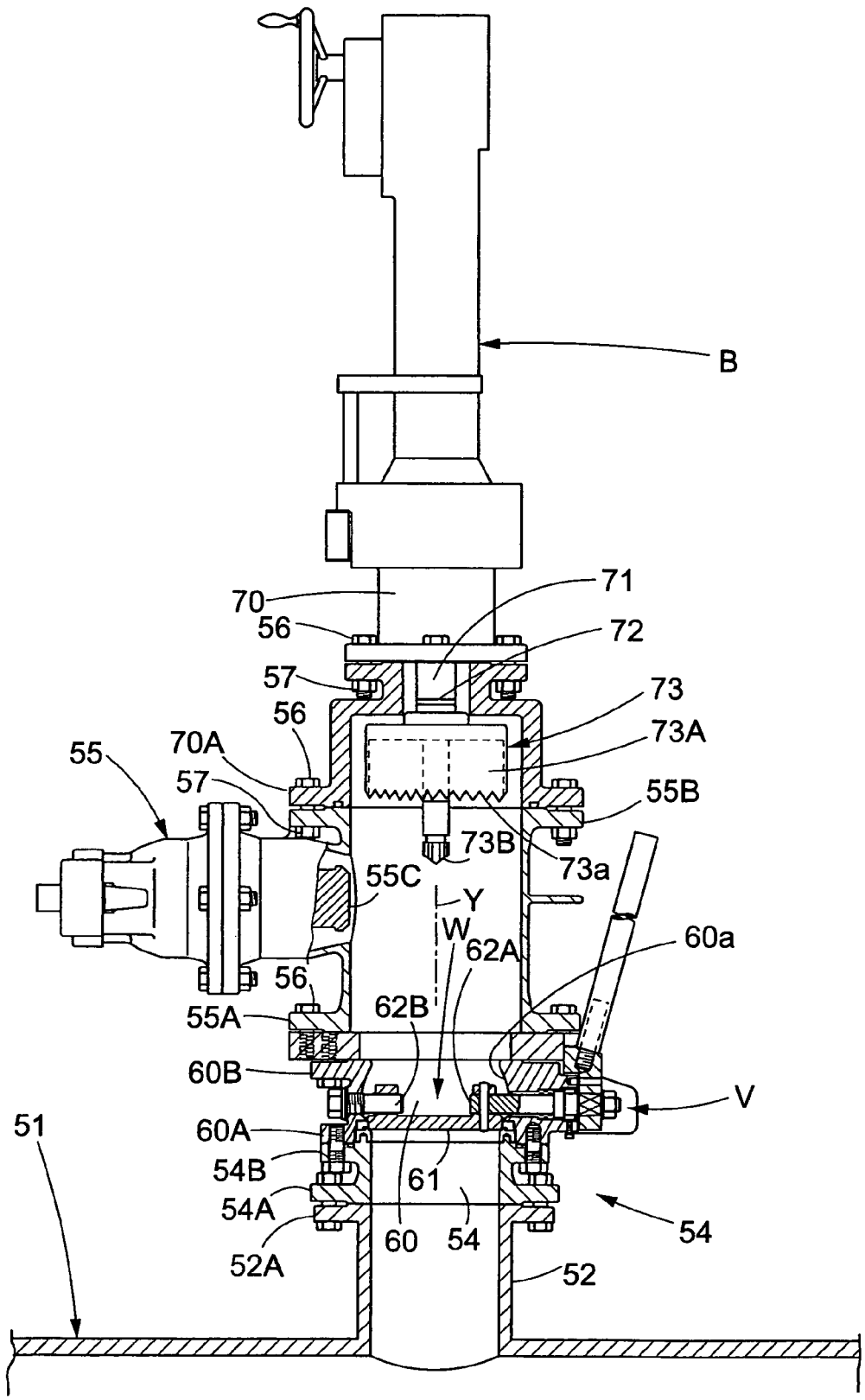
FIG. 19 Front view, partly in section, showing a condition where a drill unit is mounted.
Figure 20:
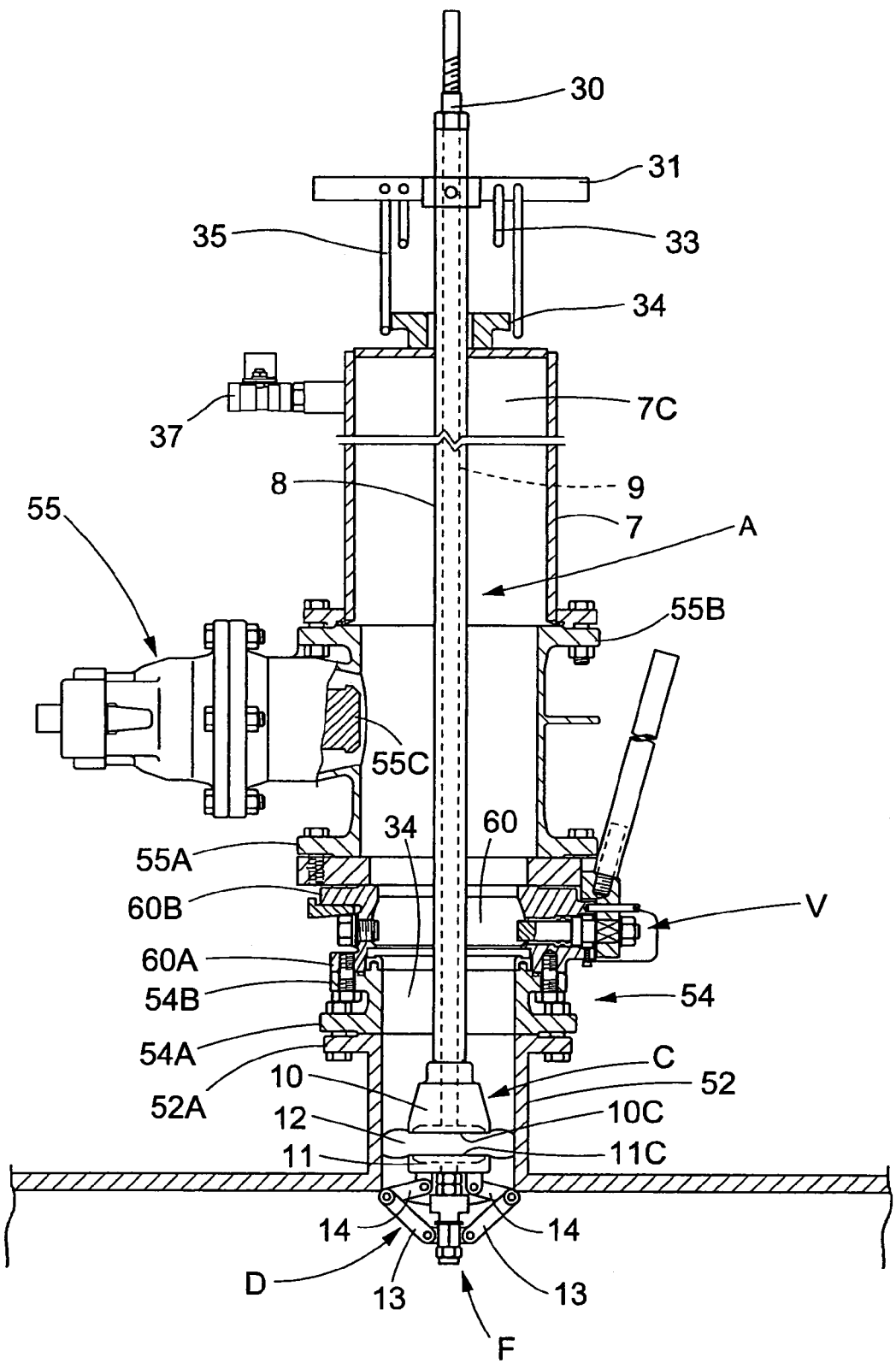
FIG. 20 Enlarged front view of a principal portion where engaging link pairs in a diameter-increased position are engaged and an elastic annual member is elastically deformed to a diameter-increased position.
Figure 21:
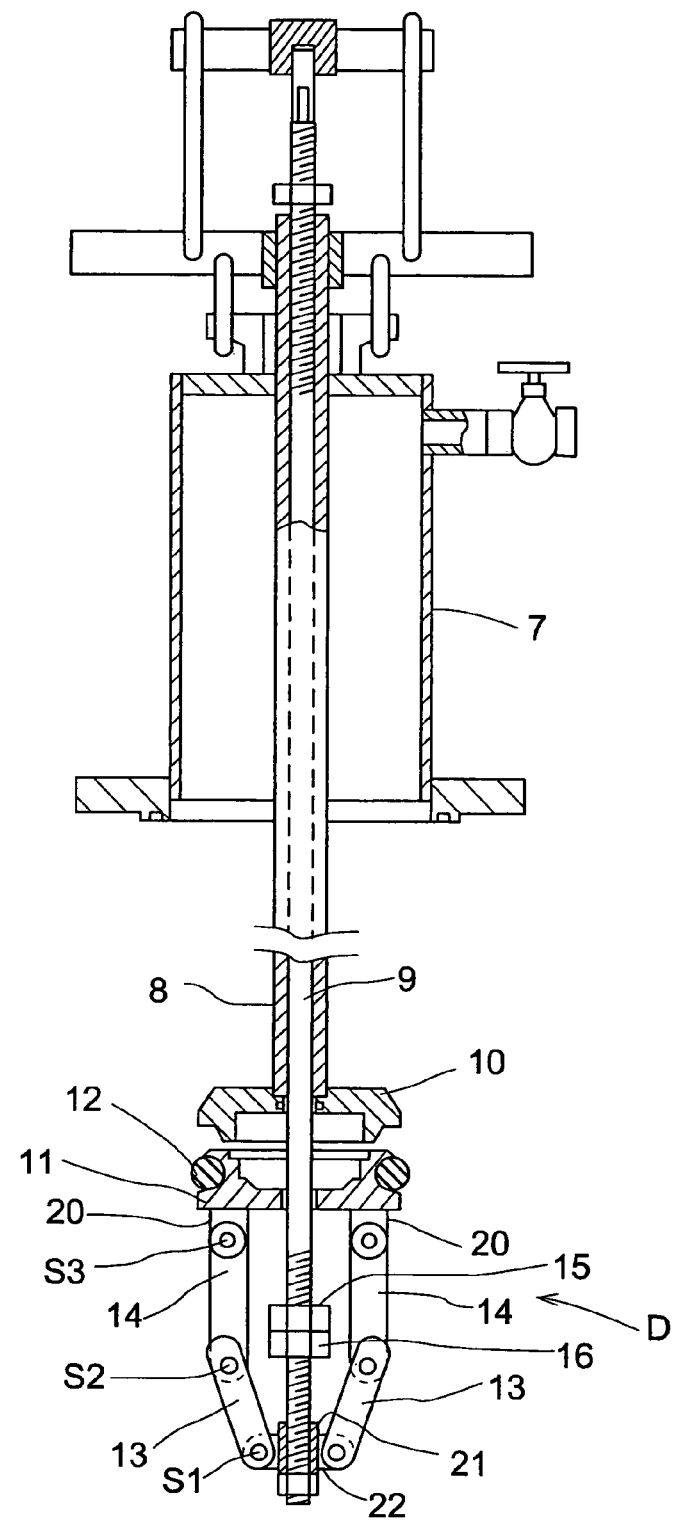
FIG. 21 Sectional front view of a conventional pipeline closing apparatus.

D retaining device
F reversal preventing device
7 lid member
8 first control shaft
9 second control shaft
10 first pressing plate
11 second pressing plate
12 elastic annular member
13 engaging links
14 engaging links

The invention claimed is:

1. A pipeline closing apparatus comprising:
a lid member attachable to a downstream end portion of a sluice valve or an end portion of a pipe portion connected thereto, the lid member adapted to close an end opening of a branch pipe connected to and diverging from a fluid transmitting main and having the sluice valve disposed therein;
a cylindrical first control shaft extending through the lid member to be axially slidable in a sealed condition;
a second control shaft extending through the first control shaft to be axially slidable;
a first pressing plate attached to an inward end region of the first control shaft;
a second pressing plate attached to an inward end region of the second control shaft upstream of the first pressing plate;
an elastic annular member disposed between the first pressing plate and the second pressing plate and elastically deformable to a diameter-increased position for tight contact with an inner peripheral surface of the branch pipe by being clamped and pressed between both of the pressing plates from axial directions, thereby blocking the inner peripheral surface and outer peripheral portions of the pressing plates; and
a retaining device provided between the inward end region of the second control shaft and the second pressing plate, and including engaging link pairs flexing and bulging to a diameter-increased position to engage with positions upstream of a position blocked by the elastic annular member in response to outward sliding movement of the second control shaft relative to the first control shaft,
wherein, in said second control shaft, there is provided a reversal preventing device having an elastic correcting member which, when the engaging link pairs of the retaining device are stretched to a diameter-reduced position, contacts and limits the engaging link pairs to an outwardly bent position where flexing pivotal portions of the engaging link pairs project radially outward.

2. The pipeline closing apparatus as defined in claim 1, wherein the reversal preventing device includes a tubular elastic correcting member mounted on the inward end region of the second control shaft for contacting at least one engaging link when the engaging link pairs stretched to the diameter-reduced position reach a predetermined outwardly bent position.

3. The pipeline closing apparatus as defined in claim 1, wherein the reversal preventing device includes a ring-shaped elastic correcting member for contacting one of the engaging links when the engaging link pairs stretched to the diameter-reduced position reach the predetermined outwardly bent position, the elastic correcting member being mounted on a mounting tubular member fitted on the inward end region of the second control shaft and having a connecting element pivotably connected to an end portion of one of the engaging links.

4. The pipeline closing apparatus as defined in claim 1, wherein the elastic annular member has a cylindrical shape and has an axially-arranged middle portion with a diameter that is larger than the diameter of axially-arranged opposite end portions.

5. The pipeline closing apparatus as defined in claim 4, wherein the axially-arranged middle portion of the elastic annular member has an outer peripheral surface with a partly spherical shape to project most outwardly at an axial middle part thereof.

6. The pipeline closing apparatus as defined in claim 1, wherein both of the pressing plates include annular holding portions to be in contact with outer circumferential surfaces of axially opposite end portions of the elastic annular member.

7. A pipeline closing apparatus as defined in claim 5, wherein the large diameter middle portion of the elastic annular member has an inner peripheral surface that is shaped partly spherical to project most outwardly at an axially middle part thereof.

8. A pipeline closing apparatus as defined in claim 2, wherein the elastic annular member has a cylindrical shape and has an axially-arranged middle portion with a diameter that is larger than the diameter of axially-arranged opposite end portions.

9. The pipeline closing apparatus as defined in claim 8, wherein the axially-arranged middle portion of the elastic annular member has an outer peripheral surface with a partly spherical shape to project most outwardly at an axial middle part thereof.

10. The pipeline closing apparatus as defined in claim 9, wherein the large diameter middle portion of the elastic annular member has an inner peripheral surface that is shaped partly spherical to project most outwardly at an axially middle part thereof.

11. The pipeline closing apparatus as defined in claim 3, wherein the elastic annular member has a cylindrical shape and has an axially-arranged middle portion with a diameter that is larger than the diameter of axially-arranged opposite end portions.

12. The pipeline closing apparatus as defined in claim 11, wherein the axially-arranged middle portion of the elastic annular member has an outer peripheral surface with a partly spherical shape to project most outwardly at an axial middle part thereof.

13. The pipeline closing apparatus as defined in claim 12, wherein the large diameter middle portion of the elastic annular member has an inner peripheral surface that is shaped partly spherical to project most outwardly at an axially middle part thereof.

\* \* \* \* \*